(12) United States Patent
Rumreich et al.

(10) Patent No.: US 11,405,688 B2
(45) Date of Patent: Aug. 2, 2022

(54) METHOD AND APPARATUS FOR PROVIDING POWER SAVING MEDIA CONTENT

(71) Applicant: Interdigital Madison Patent Holdings, SAS, Paris (FR)

(72) Inventors: Mark Francis Rumreich, Indianapolis, IN (US); Thomas Edward Horlander, Indianapolis, IN (US); Chad Andrew Lefevre, Indianapolis, IN (US)

(73) Assignee: Interdigital Madison Patent Holdings, SAS, Paris (FR)

(*) Notice: Subject to any disclaimer, the term of this patent is extended or adjusted under 35 U.S.C. 154(b) by 563 days.

(21) Appl. No.: 15/759,800

(22) PCT Filed: Aug. 17, 2016

(86) PCT No.: PCT/US2016/047379
§ 371 (c)(1),
(2) Date: Mar. 13, 2018

(87) PCT Pub. No.: WO2017/048447
PCT Pub. Date: Mar. 23, 2017

(65) Prior Publication Data
US 2018/0255350 A1  Sep. 6, 2018

Related U.S. Application Data

(60) Provisional application No. 62/218,679, filed on Sep. 15, 2015.

(51) Int. Cl.
*G06F 1/00* (2006.01)
*H04N 21/443* (2011.01)
(Continued)

(52) U.S. Cl.
CPC ... *H04N 21/4436* (2013.01); *H04N 21/26258* (2013.01); *H04N 21/4318* (2013.01);
(Continued)

(58) Field of Classification Search
CPC ......... H04N 21/4436; H04N 21/26258; H04N 21/4318; H04N 21/84; H04N 21/4345;
(Continued)

(56) References Cited

U.S. PATENT DOCUMENTS 6,665,751 B1  12/2003  Chen
7,376,331 B2  5/2008  Cheng
(Continued)

FOREIGN PATENT DOCUMENTS

CN  101859549 A  10/2010
CN  103078390 A  5/2013
(Continued)

OTHER PUBLICATIONS

Fernandes et al., "The Green Metadata Standard for Energy-Efficient Video Consumption", IEEE Multimedia Magazine, vol. 22, No. 1, Jan.-Mar. 2015, pp. 80-87.
(Continued)

*Primary Examiner* — Xuxing Chen
(74) *Attorney, Agent, or Firm* — Invention Mine LLC

(57) ABSTRACT

Method (1000) of providing power saving information for media content is described including receiving (1010) media content comprising a plurality of media segments, determining (1020) a power consumption indicator for a media segment of the plurality of media segments, determining (1030) power saving information for the media segment based on the power consumption indicator for the media segment and providing (1040) the power saving information. Method (1100) of receiving power saving information for media content is described including receiving (1110)
(Continued)

power saving information for a media segment in a media content, applying (1120) said power saving information to the media segment to generate a power adjusted media content and providing (1130) the power adjusted media content. Equivalent apparatuses for providing (110, 200) and for receiving (120, 200, 250) power saving information for media content are also provided.

26 Claims, 10 Drawing Sheets

(51) Int. Cl.
    *H04N 21/845* (2011.01)
    *H04N 21/84* (2011.01)
    *H04N 21/431* (2011.01)
    *H04N 21/262* (2011.01)
    *H04N 21/434* (2011.01)
    *H04N 21/8543* (2011.01)
    *H04N 21/4402* (2011.01)

(52) U.S. Cl.
    CPC ......... *H04N 21/4345* (2013.01); *H04N 21/84* (2013.01); *H04N 21/8456* (2013.01); *H04N 21/440281* (2013.01); *H04N 21/8543* (2013.01)

(58) Field of Classification Search
    CPC ....... H04N 21/8456; H04N 21/440281; H04N 21/8543
    See application file for complete search history.

(56) References Cited

U.S. PATENT DOCUMENTS

| | | | |
|---|---|---|---|
| 7,676,142 B1 | 3/2010 | Hung | |
| 8,135,443 B2 | 3/2012 | Aleksic | |
| 8,644,677 B2 | 2/2014 | Zalewski | |
| 9,438,936 B1 | 9/2016 | Srinivasan | |
| 2003/0093790 A1 | 5/2003 | Logan et al. | |
| 2005/0213929 A1* | 9/2005 | Cheng | G06F 1/3203 386/277 |
| 2008/0297662 A1 | 12/2008 | Gibbs | |
| 2009/0244408 A1* | 10/2009 | Kamada | H04N 5/50 348/790 |
| 2010/0245316 A1* | 9/2010 | Cheng | G09G 3/3648 345/211 |
| 2011/0135114 A1* | 6/2011 | Oba | H04N 21/42201 381/107 |
| 2011/0302238 A1 | 12/2011 | Sood | |
| 2013/0141642 A1* | 6/2013 | Wu | G09G 5/363 348/441 |
| 2013/0148940 A1* | 6/2013 | Schmit | H04N 5/783 386/230 |
| 2013/0278834 A1 | 10/2013 | Ma et al. | |
| 2013/0308919 A1* | 11/2013 | Shaw | H04N 21/6473 386/239 |
| 2013/0328845 A1* | 12/2013 | Pylappan | G06F 3/14 345/211 |
| 2013/0343450 A1 | 12/2013 | Solka et al. | |
| 2014/0198851 A1 | 7/2014 | Zhao | |
| 2014/0270703 A1 | 9/2014 | Wang | |
| 2014/0282795 A1 | 9/2014 | Kummer | |
| 2014/0306892 A1* | 10/2014 | Lin | H04N 5/23254 345/159 |
| 2015/0012938 A1 | 1/2015 | Kosslyn | |
| 2015/0043896 A1 | 2/2015 | Gilson | |
| 2015/0243067 A1* | 8/2015 | Ishikawa | G02B 27/017 345/473 |
| 2016/0035140 A1* | 2/2016 | Bickerstaff | G06T 19/006 345/633 |
| 2016/0309241 A1* | 10/2016 | Ljung | H04N 21/4436 |
| 2017/0054659 A1* | 2/2017 | Ergin | H04L 45/586 |
| 2017/0280098 A1* | 9/2017 | Sethuraman | H04N 7/15 |
| 2020/0099943 A1 | 3/2020 | He | |

FOREIGN PATENT DOCUMENTS

| | | |
|---|---|---|
| CN | 104049967 A | 9/2014 |
| CN | 104604241 A | 5/2015 |
| CN | 104782124 A | 7/2015 |
| JP | 2008299320 A | 12/2008 |
| JP | 2008300918 A | 12/2008 |
| WO | 2010096639 A1 | 8/2010 |
| WO | WO2014011622 | 1/2014 |
| WO | 2017048887 A1 | 3/2017 |
| WO | 2018031598 A1 | 2/2018 |

OTHER PUBLICATIONS

Anonymous, "Information Technology—MPEG Systems Technologies—Part 11: Energy-Efficient Media Consumption (Green Metadata)", International Standarisation Organisation ISO/IEC JTC 1/SC 29, Draft International Standard ISO/IEC SoDIS 23001-11, Apr. 26, 2013, pp. 1-54.

Anonymous, "SplashPRO User Manual", Mirillis Company, Nov. 8, 2011, pp. 1-31.

International Preliminary Report on Patentability for PCT/US2016/047379 dated Mar. 20, 2018, 7 pages.

International Search Report and Written Opinion of the International Searching Authority for PCT/US2016/047379 dated Nov. 3, 2016, 11 pages.

International Search Report and Written Opinion of the International Searching Authority for PCT/US2017/045993 dated Sep. 19, 2017, 11 pages.

Kalman, Mark, et al., "Adaptive Media Playout for Low-Delay Video Streaming Over Error-Prone Channels". IEEE Transactions On Circuits And Systems For Video Technology, vol. 14, No. 6, Jun. 2004, pp. 841-851.

International Preliminary Report on Patentability for PCT/US2017/045993 dated Feb. 12, 2019, 7 pages.

International Search Report and Written Opinion of the International Searching Authority for PCT/US2016/051809 dated Feb. 3, 2017, 15 pages.

International Preliminary Report on Patentability for PCT/US2016/051809 dated Mar. 20, 2018, 9 pages.

\* cited by examiner

METHOD AND APPARATUS FOR PROVIDING POWER SAVING MEDIA CONTENT

CROSS-REFERENCE TO RELATED APPLICATION

This application is a national stage application under 35 U.S.C. § 371 of International Application PCT/US2016/047379, filed on Aug. 17, 2016, which was published in accordance with PCT Article 21(2) on Mar. 23, 2017, in English, and which claims the benefit of U.S. Provisional Application No. 62/218,679, filed on Sep. 15, 2015.

TECHNICAL FIELD

The present disclosure generally relates to media content processing. In particular, the present disclosure relates to energy saving content and/or metadata for conserving power consumption while viewing the content.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Many modern televisions and display devices display content of varying brightness and dynamically vary power. Under normal viewing conditions, typical Liquid Crystal Display (LCD) television receivers may consume 150 Watts of power. About half of the power consumption is due to the backlighting of a display. Many backlights are zone dimmable, allowing contrast enhancement by dimming the backlight in dark scene areas. When zone dimmable backlighting is used, the power consumed by a display depends on zone brightness. For example, an all-white scene might consume 150 Watts, an all-black scene 75 Watts, an all-gray scene 110 Watt. A scene with the left side of the screen black and the right side white might consume 110 Watts.

Many TVs today also provide an energy saving mode that reduces the overall backlight brightness regardless of the scene content. However, these devices do not save power depending on program content, anticipated future scenes, or having knowledge of power utility conditions. They are therefore limited in their abilities to reduce power consumption. Hence, there is a need to address the problems discussed above and to provide efficient techniques to further decrease power consumption in television receivers or other wired or wireless video processing devices. The present disclosure is directed towards such techniques.

SUMMARY

According to an aspect of the present disclosure, a method of providing power saving information for media content is provided, the method including receiving media content including a plurality of media segments, determining a power consumption indicator for a media segment of the plurality of media segments, determining power saving information for the media segment based on the power consumption indicator for the media segment, and providing the power saving information.

According to an aspect of the present disclosure, an apparatus for providing power saving information for media content, the apparatus including a processor in communication with at least one input/output interface, and at least one memory in communication with the processor, the processor being configured to receive media content including a plurality of media segments, determine a power consumption indicator for a media segment of the plurality of media segments, determine power saving information for the media segment based on the power consumption indicator for the media segment, and provide the power saving information.

According to an aspect of the present disclosure, a method of receiving power saving information for media content, the method including receiving power saving information for a media segment in a media content, applying the power saving information to the media segment to generate a power adjusted media content, and providing the power adjusted media content.

According to an aspect of the present disclosure, an apparatus for receiving power saving information for media content, the apparatus including a processor in communication with at least one input/output interface, and at least one memory in communication with the processor, the processor being configured to receive power saving information for a media segment in a media content, apply the power saving information to the media segment to generate a power adjusted media content, and provide the power adjusted media content.

Additional features and advantages of the present disclosure will be made apparent from the following detailed description of illustrative embodiments which proceeds with reference to the accompanying figures.

BRIEF DESCRIPTION OF THE DRAWINGS

The present disclosure may be better understood in accordance with the following exemplary figures briefly described below.

DETAILED DESCRIPTION

Figure 1:
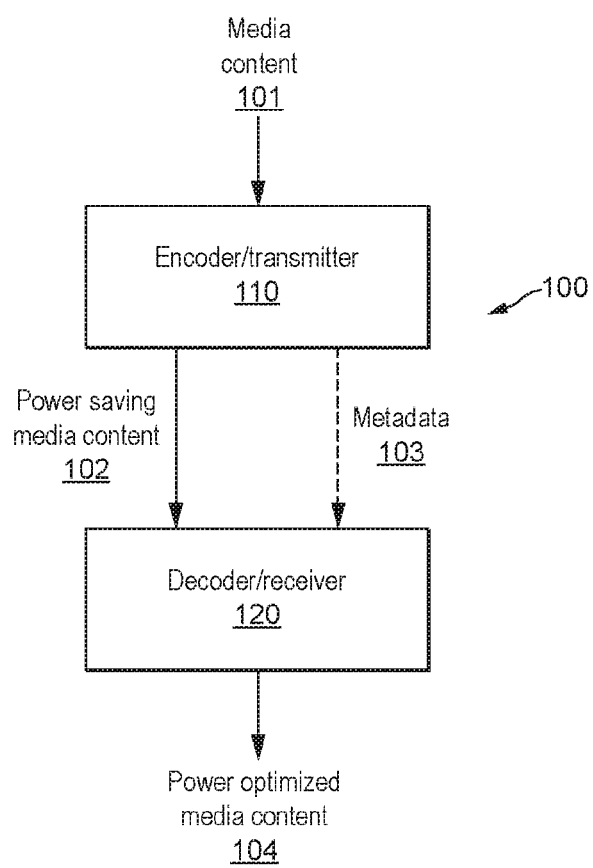
FIG. 1 illustrates a schematic diagram of an exemplary system in accordance with an embodiment of the present disclosure.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

An aspect of the present disclosure is directed to determining power savings or power optimizations for power that is anticipated, forecasted or estimated to be used when media content is displayed or provided. As used herein, "power savings" can be defined to include reducing consumption of power and/or energy. Power savings may further refer to "green" or energy efficient versions of media content. Power savings may further refer to power optimization based on consumption load and/or infrastructure. For example, the power may be determined based on anticipated, forecasted or estimated content power usage at an end user apparatus or device.

An aspect of the present disclosure is directed to determining power consumption of media content and/or media content segments or subunits. Thereby, power consumption or power determinations, as discussed herein reference anticipated, forecasted or estimated power consumptions and/or usage by an apparatus and/or system. The estimated power consumption may be, for example, a power consumption indicator based on a measure of a property of the content such as luminance.

As used herein, "media content" may be defined to include any type of media, including any type of audio, video, and/or image media content received from any source. For example, "media content" may include Internet content, streaming services (e.g., M-GO, Netflix, Hulu, Amazon), recorded video content, video-on-demand content, broadcasted content, television content, television programs (or programming), advertisements, commercials, music, movies, video clips, interactive games, network-based entertainment applications, and other media assets. Media assets may include any and all kinds of digital media formats, such as audio files, image files or video files.

An aspect of the present disclosure is directed to reducing power consumption when providing media content (e.g., when displaying or playing media content at an end user device). An aspect of the present disclosure is directed to modifying or providing an option to modify a media content speed, i.e., speeding up or slowing down the presentation time. In one embodiment, the speed may be modified by scaling the duration of each video frame, or equivalently, each bit of data. In one embodiment, increasing (or decreasing) the speed may be equivalent to increasing (or decreasing) the presentation bit or frame rate (i.e., raster frame rate) with respect to the original or received frame rate of the media content for a same number of frames in the content. For example, playout speed modification has a precedent in traditional media broadcasting, since motion pictures shot at a frame rate of 24 frames per second (f/s) were shown on European Phase Alternating Light (PAL) and Sequential Color Television (SECAM) broadcast television systems at 25 f/s. This represents a constant speedup of 4.2% and it is done without audio time scale modification. Higher speed variations may be possible without noticeable effect, depending on the media content. Audio may be possibly processed to adjust the pitch to improve a user's ability to comprehend accelerated and decelerated audio content. Pitch adjustment can prevent the audio from sounding very high pitched in the event that playback speed is increased and can prevent audio from sounding very low pitched in the event that playback speed is decreased.

In one embodiment, the media content speed may also be modified by decreasing or increasing the number of video frames. If the presentation rate (frame or bit rate) is the same as the received or original rate, slowing down the media content may be equivalent to an increase in the number of frames. The increase in the number of frames may be accomplished through interpolation or repetition of frames. Similarly, if the presentation rate is the same as the received or original rate, speeding up the media content may be equivalent to a decrease in the number of frames. The decrease in the number of frames may be accomplished by dropping frames or dropping frames with additional filtering to correct for distortions (the latter also called decimation). For example, the presentation or playout time of a media content segment may be reduced by 10% such that, for every 10 frames in the original media content segment, only 9 frames are provided. In another example, the presentation or playout time of a media content segment may be increased by 10%, such that for every 10 frames in the original media content segment, 11 frames are provided via interpolation or repetition.

In one embodiment, both the frame rate and the number of frames in the content may be simultaneously modified, in order to modify the speed of the media content. For example, the frame rate may increase and the number of frames may decrease in order to speed up the content. Or the frame rate may decrease and the number of frames may increase in order to slow down the content. Other combinations are possible with varying results.

An aspect of the present disclosure is directed to modifying a playout time of a segment of media content based on a power consumption indication of the media content segment.

An aspect of the present disclosure is directed to power savings based on media content speed. An aspect of the present disclosure is directed to power savings based on adaptively modifying a speed at which media content is provided. An aspect of the present disclosure is directed to power savings based on media content speed modifications adapted to the media content. Speed modifications (e.g., a faster or a slower speed) may be performed on a slice basis, a frame-by-frame basis, a film-frame basis, a Group of Pictures (GOP) basis, a video scene basis, or any other media segment basis. An aspect of the present disclosure is directed to increasing or decreasing a speed at which media content is provided based on media content power considerations. An aspect of the present disclosure is directed to power savings based on modifying a speed of media content segment(s). An aspect of the present disclosure is directed to power savings based on modifying a speed of media content segment(s) relative other segment(s) of the same media content.

An aspect of the present disclosure is directed to determining speed ranges or boundaries (e.g., the maximum speed and/or the minimum speed) based on content information. For example, speed range(s) may be determined based on one or more of media scene content, dialogue, media content geographic location (the location(s) portrayed within the media content or the location where the media content is being viewed), preferences, or viewing tolerances (e.g., maximum amount of hours that media content may be observed).

In one embodiment, power savings may be achieved by modifying a speed of displaying or playing video segments, that is, the playout time of the video segments. For example, power savings may be based on speeding up high power video segments, where the amount of speed up is constrained to be within a determined maximum speed boundary. In another embodiment, power savings may be based on slowing down low power video segments, where the amount of slowdown is constrained to be within a determined minimum speed boundary. In one embodiment, the power savings may be achieved while substantially maintaining the same total duration of a video.

An aspect of the present disclosure is directed to pre-processing of media content. For example, media content may be pre-processed at a content server in order to determine power savings indicators. In one embodiment, a video may be pre-processed at a video server to determine power consumption parameters. The pre-processing at the server may provide the benefit of a server's higher computational power, higher accuracy and ability to process an entire program in order to assure substantially the same total program duration.

An aspect of the present disclosure is directed to determining power saving versions of media content. For example, an aspect of the present disclosure is directed to determining a plurality of versions of media content (e.g., a program, a video). One version may be a normal version that comprises the original media content while one or more versions may be power saving versions of the original media content. In one embodiment, a power saving version may have a different duration of time than the original media content. In one embodiment, a power saving version may have substantially the same total time duration as the original media content, but may have different speeds for various scenes. Substantially the same total duration may imply a media content total duration within a percentage value of the original media content duration. In one embodiment, the percentage value may be +/−5% of the original media content duration. In one embodiment, a media content playout unit (e.g., a set top box, television, tablet, smartphone, computer or the like) may dynamically switch between the plurality of power saving versions (e.g., by switching between versions of media content segments based on user input). In another embodiment, the media content providing unit may automatically transition between power versions of media content segments. A media content version may be chosen at a receiving device based on an energy consumption profile (e.g., per user), or other energy parameters (e.g., time of day, cost of electricity, energy consumption profiles, total energy consumption, total energy consumption at a home). In one embodiment, power saving versions of media content may be offered along with the conventional media content (e.g., by a streaming media website such as Netflix, Amazon, M-GO, and other streaming providers). Each power saving version may include an indicator for indicating different media content speeds. These indicators may be encoded/decoded along with corresponding media content. In one embodiment, the indicators may be metadata that is provided along with media content and/or media content segments.

An aspect of the present disclosure is directed to metadata which may indicate media content speeds. The metadata may include information regarding time stamps or media content points indicating media content speed changes. For example, the metadata may include information regarding when a media content speed is fast, slow or normal. A fast speed may be, e.g., a speed 10% faster than normal. A slow speed may be, e.g., a speed 10% slower than normal. A normal speed may be an original speed of presentation of the media content. In one embodiment, the metadata may be generated and/or transmitted by an encoder or a content server.

An aspect of the present disclosure is directed to metadata indicating media content speed versions. For example, metadata may indicate a first "fast" version and a second "slow" version of the same media content or media segment. The metadata may provide flexible indications of media content speed(s). A transmitting or encoding device may provide metadata relating to different speeds or speed adjustment(s) based on content and/or energy rating(s) of media segments (e.g., video segments). A receiving device may utilize the metadata to control the speed of providing (e.g., displaying) media content. For example, a receiver can incrementally adjust media content display speed based on received metadata information. In another embodiment, a receiving device may adjust the media content speed based on metadata indications of speed-up and slow-down relative to a "normal" speed.

An aspect of the present disclosure is directed to metadata that indicates various video content play speeds. Table 1 illustrates such metadata information that relates to video media content play speeds. The "Play Speed" column relates to identifiers of different play speeds. The "Start" column indicates the starting video frame number. The "End" column indicates the ending video frame number. The "Duration" column corresponds to the total number of video frames.

TABLE 1

| Play Speed | Start | End | Duration |
|---|---|---|---|
| FAST1 | Picture Order Counter = 459 | Picture Order Counter = 598 | |
| FAST3 | Picture Order Counter = 9488 | | 417 frames |
| SLOW2 | Picture Order Counter = 27987 | Picture Order Counter = 30112 | |

An aspect of the present disclosure is directed to metadata that allows an achievement of power savings. The power savings may be based on metadata relating to one or more of current scene content, future scene content, program type and other media content information. The metadata may relate to speed information, for example, frame rate or number of frames information. The metadata may include indicators relating to one or more of speed (when speed changes are executed), duration of a speed change, start of a speed change and end of a speed change.

An aspect of the present disclosure is directed to metadata that is transmitted or received. For example, an aspect of the present disclosure relates to determining and transmitting metadata by a transmitter. An aspect of the present disclosure is directed to metadata that is received at a receiver. The receiver may provide media content for observation based on the received metadata. The metadata may be delivered in-band with the corresponding media content, or out-of-band as a separate file or separate stream. For example, for in-band metadata, the arrival of the metadata may indicate when a speed operation should begin and/or end. In one embodiment, unique markers, such as presentation time stamps or picture order counts, may be used to indicate when a speed operation should begin and/or end.

An aspect of the present disclosure is directed to metadata indicating power consumption control for televisions and other appliances during high peak load time period(s). In one embodiment, the metadata may indicate the degree of desired power saving. A consumer device (e.g., television) may provide an optimized power saving process based on the received metadata.

An aspect of the present disclosure is directed to providing enhancements to home network power consumption. For example, power consumption information of a device or apparatus may be provided to a utility service provider. The utility service provider may change either media content or metadata. Conversely, the utility service provider may provide dynamic rate information (e.g., price per kilowatt hour) to a device in order for it to adaptively control a power saving algorithm. Alternatively, the device or apparatus may modify media content based on a current energy usage. Alternatively, the apparatus can be controlled by another home appliance. In one embodiment, the power saving determinations may be performed based on software and/or hardware. The power saving determinations may be based on parameters provided by the service provider that may optimize both or either of power consumption and user experience. The power consumption information can be integrated with whole home power consumption or room lighting to improve the experience while also reducing energy usage.

Aspects of the present disclosure may be implemented within the figures described below.

FIG. 1 illustrates a schematic diagram of a system 100 in accordance with the present disclosure. The system 100 may include an encoder/transmitter 110 and a decoder/receiver 120.

The encoder/transmitter 110 may be an apparatus or system including: an encoder apparatus for encoding media content (e.g., video), a transmitter for transmitting power saving media content (e.g., internet protocol information), a media content server (e.g., a head-end server for preparing power saving versions of media content), and a streaming service provider (e.g., for providing streaming media content), or any other apparatus for providing media content.

The encoder/transmitter 110 may receive media content 101, which may be video content. The media content 101 may be compressed or non-compressed media content. Examples of non-compressed media content include video in various RGB formats. Examples of compressed media content include video compressed in accordance with e.g., MPEG2, H.264, H.265, and any other video compression standards.

The encoder/transmitter 110 may determine power saving speed modifications for the media content 101 in accordance with any principles described herein. For example, the encoder/transmitter 110 may determine a plurality of power saving versions of media content 101. The plurality of power savings versions may then be compressed resulting in the power saving media content 102. In another embodiment, the encoder/transmitter 110 may determine indicators indicating different media content playout times or speeds and the times when the speeds should be applied. Such indicators may be encoded as part of metadata 103. In one embodiment, the encoder/transmitter 110 may determine power saving speed modifications in accordance with the techniques described in connection with FIGS. 2A, 2B, 3-11 described below. The encoder/transmitter 110 may provide power saving media content 102 based on the power savings speed determinations of the media content 101.

The encoder/transmitter 110 may optionally provide the metadata 103. The metadata may indicate the speed and/or media content observation times. The power savings determinations may also be included within the metadata 103. For example, metadata 103 may be part of the power saving media content 102 or may be transmitted or provided separately from the media content 102. When metadata is separately provided, media content 102 may be media content 101. The transmission of the metadata 103 may be via the same or different communication paths or systems other than that of the media content 102.

The decoder/receiver 120 may be an apparatus or system, including: a decoder apparatus for decoding media content (e.g., video, a receiving apparatus for receiving media content (e.g., internet protocol information), a consumer-end device (e.g., a set top box, a Blu-Ray player, a television, a smart television, a gaming console, a laptop, a full-sized personal computer, a smart phone, a tablet PC, and any other device for providing media content). The decoder/receiver 120 may receive the power saving media content 102 and the metadata 103.

The decoder/receiver 120 may determine power optimized media content 104 based on the power saving media content 102 and/or the metadata 103. The decoder/receiver 120 may perform decoding operations on the received power saving media content 102 and/or the metadata 103. The power optimized media content 104 is media content adjusted or modified to decrease the power consumption of a device during viewership of the content.

The decoder/receiver 120 may provide the power optimized media content 104 for observation or display. The decoder/receiver 120 may utilize the metadata 103 to control the playout time of the media content, that is, to control the speed of displaying power optimized media content 104. For example, the decoder/receiver 120 can incrementally adjust media content display speed based on the metadata 103. In one embodiment, the decoder/receiver 120 may determine power saving speed modifications in accordance with the techniques described in connection with FIGS. 2A, 2B, and 3-11 described below.

Figure 2A:
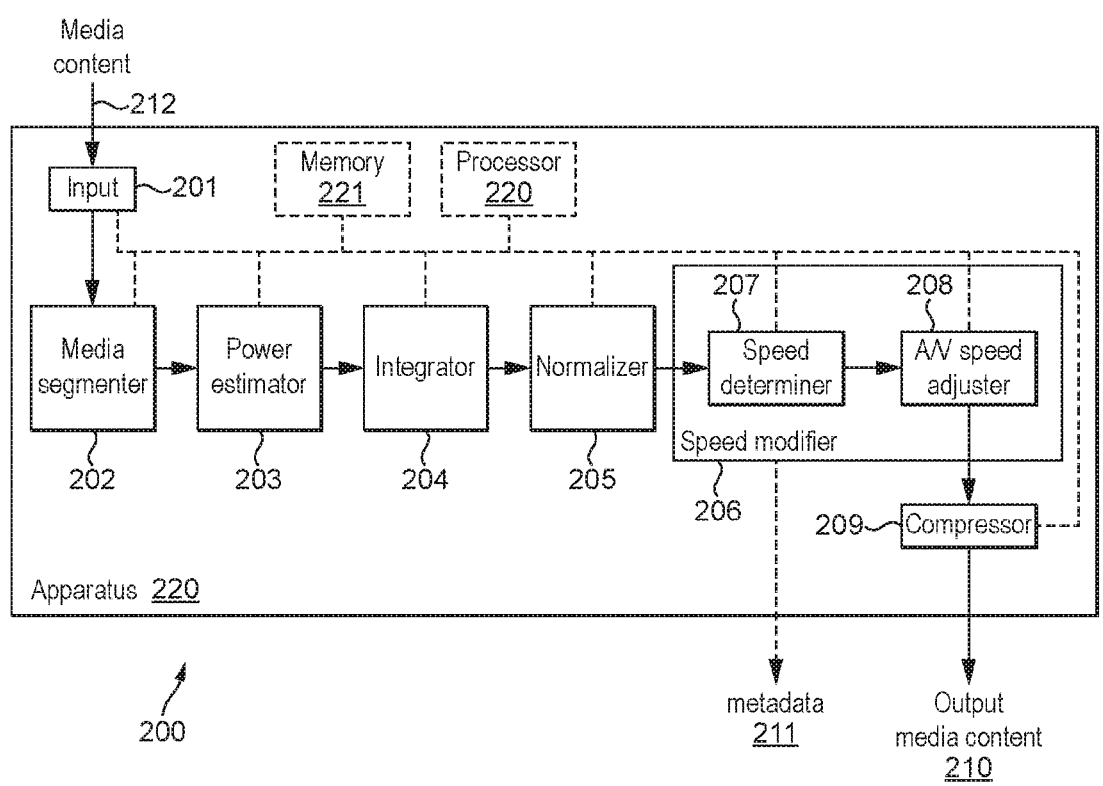
FIG. 2A illustrates a schematic diagram of an exemplary apparatus in accordance with an embodiment of the present disclosure.

FIG. 2A illustrates a schematic diagram of an apparatus 200 in accordance with the present disclosure. Apparatus 200 may be an apparatus capable of processing instructions and generating transmittable information or of receiving transmittable information. The apparatus 200 may be similar to the encoder/transmitter 110 or decoder/receiver 120 described in connection with FIG. 1. For example, the apparatus 200 may be a transmitter, an encoder, or a head-end server.

The apparatus 200 may receive media content 212, for example, via input interface 201. The media content 212 may be in compressed or non-compressed form. Examples of compressed media content such as content which has been compressed in accordance with MPEG2, H.264, H.265, and any other compression standards. Examples of non-compressed media content include video in RGB formats. The media content 212 may be media content as described in connection with FIG. 1. Media content 212 may be similar to media content 101. The input interface 201 may receive the media content 212 for processing. The input interface 201 may be a video input terminal, bus, connector, input video buffer, communications port, etc.

Media segmenter 202 segments media content. The media segmenter may segment media content (e.g., a video) into media segments. In one embodiment, media segmenter 202 segments the media content into different sections, portions, frames, blocks, Group of Pictures (GOPs), slices, scenes, fragments (such as fragmented MP4 supported in MPEG DASH), any other type of segments (e.g., as used in Segmented Adaptive Transport Stream of HLS), and any other type of time intervals (either dynamic time intervals or uniform time intervals, e.g., 2 seconds, 5 seconds). In one embodiment, the media content may already be segmented and media segmenter 202 may be optional, bypassed or removed. Power saving determinations may be performed based on these media segments. The segment size may be optimized based on practical considerations. For example, if the segments are too small, it may be difficult to change the speed. However, if the segments are too long, there may be missed opportunities for power savings.

Power estimator 203 determines power consumption for media segments that were previously determined, e.g., by media segmenter 202. In one embodiment, power estimator 203 may determine power consumption through any power determination method. For example, the power estimator 203 may determine an average or a normalized luminance value of pixels of respective content from each of the segmented portions. The power consumption may be determined based on an average or a normalized luminance, as a linear or a non-linear function, or a mapping of the luminance. In one embodiment, the power estimator 203 may determine an average power of a scene based on an average power of media segments that compose the scene. In one embodiment, the average power may be determined by dividing the energy of that scene by the duration of the scene. The power estimator 203 may estimate power consumption or energy of media segment(s) or media segment subunit(s) (e.g., frames). In one embodiment, the power may be power that is anticipated, forecasted or estimated to be used when the media content is displayed or provided. That is, the apparatus 200 may anticipate, forecast or estimate the power that is associated with the content on an end user apparatus or device.

Integrator 204 may integrate or sum, over a time period, power consumption of media segments or subunits of a media segment. For example, the integrator 204 may integrate power of all frames in a segmented scene, thus providing a total power or a total energy of the segmented scene. In one embodiment, integrator 204 may be optional or may be only utilized based on certain conditions. For example, the integrator 204 may only be utilized when a scene has been segmented, (e.g., when a video scene is segmented into more than one video frames). The integrator 204 may sum the total power or energy of all media segments in a frame or a scene.

Normalizer 205 may determine average power consumption for a scene. In one embodiment, the normalizer 205 may divide the energy of a scene by the number of media segments or media segments subunits in the scene. For example, the normalizer 205 may divide the total power or energy determined by integrator 204 by the number of frames in a scene evaluated by integrator 204. The normalizer 205 may determine an average power or energy per frame, per time interval, time period, or per any media segment subunit. In one embodiment, the normalizer 205 and integrator 204 may be optional, bypassed or removed, or may be integrated as part of power estimator 203.

Speed modifier 206 may receive power consumption information from power estimator 203, integrator 204 and/or normalizer 205. The speed modifier 206 may include a speed determiner 207 and an audio/video ("A/V") speed adjuster 208. In one embodiment, the speed determiner 207 and the AN speed adjuster 208 may be integrated into the speed modifier 206.

The speed determiner 207 determines the speed for providing each media segment. The speed determiner 207 may determine the speed of a segment based on the power consumption determined by the power estimator 203, integrator 204 and/or normalizer 205. In one embodiment, the speed determiner 207 may determine a modified start and end time for the segment. In one embodiment, the speed determiner 207 may determine a faster or slower speed of media content.

In one embodiment, the speed determiner 207 may determine modified speed for one or more media segment(s) based on average power consumption. In one embodiment, the speed determiner 207 may determine a speed based on a direct relationship to power consumption. The speed determiner may determine a speed of a media segment based on a direct relationship between an average power of the media segment and the speed of that segment. For example, if a media segment has relatively higher power consumption, then the speed determiner 207 may then increase the speed of that segment. Likewise, if a media segment has relatively lower power consumption, then the speed determiner 207 may then decrease the speed of that segment.

Generally, the speed determiner 207 may reduce the duration of high power segments and increase the duration of low power segments. The speed determiner 207 may also track the overall speed of the program to ensure that, despite the speed changes, the overall total time of the media content remains approximately the same. In one embodiment, the total media content time remains the same. In another embodiment it is less or more than the original media content time.

In one embodiment, the speed determiner 207 may determine speed modifications based on shifting a reference threshold associated with the power consumption of the media content. In one embodiment, the threshold may be determined in accordance with the principles described in connection with reference threshold 505 of FIG. 5.

In another embodiment, the speed determiner 207 may determine speed modifications based on a change of characteristics of a slope of transfer. In one embodiment, the change of slope transfer characteristics may be determined in accordance with the principles described in connection with FIG. 6.

In another embodiment, the speed determiner 207 may determine speed modifications based on changing the maximum range of allowable speeds, respectively. In one embodiment, the speed determiner 207 may determine speed modifications based on a combination of shifting the reference threshold, changing the slope of the transfer characteristic, and changing the maximum range of allowable speeds.

In one embodiment, the A/V speed adjuster 208 may be an audio/video speed adjustment playout unit. For example, the A/V speed adjuster 208 may increase the speed of a video segment, (e.g., by adjusting the playout or presentation times of the video segment). Alternatively, the A/V speed adjuster 208 may decrease the speed of a video segment, (e.g., by adjusting the playout or presentation times of the video segment). In one embodiment, the A/V speed adjuster 208 may not be utilized because metadata may indicate speed adjustments to a downstream receiving device that has its own A/V speed adjustment unit. In this case the metadata 211 is provided to the downstream A/V speed adjustment unit to guide the applied speed adjustments.

The speed modifier 206 may further determine metadata 211. The metadata 211 may be determined based on the speed modifications provided by speed modifier 206. For example, the metadata 211 may indicate media content speeds. The metadata 211 may include information regarding time stamps or media content points indicating the position where the media content speed changes. For example, the metadata 211 may include information regarding when a media content speed is a fast, a slow and a normal speed. A fast speed may be, e.g., a speed 10% faster than normal. A slow speed may be, e.g., a speed 10% slower than normal. A normal speed may be an original speed of presentation of the media content. Metadata 211 may include information regarding when a media content frame rate is a high, low or normal frame rate. Metadata 211 may include information regarding when a media content number of frames in a segment is high, low or normal. High may be, e.g., 10% higher than normal. Low may be, e.g., 10% lower than normal. Normal may be an original frame rate or number of frames of presentation of the media content. Alternatively, metadata 211 may indicate media content speed versions (e.g., fast, slow, normal, and/or the actual speed). For example, metadata 211 may be metadata as described in connection with Table 1. The metadata 211 may allow for the achievement of power savings. The metadata 211 may relate to one or more of current scene content, future scene content, program type and other media content information. The metadata 211 may relate to speed information. The metadata may include indicators relating to one or more of speed, when speed changes are executed, duration of a speed, start of a speed change, and end of a speed change. In one embodiment, the media content may be unmodified and the speed modifications may only be indicated in the metadata. In one embodiment, the metadata may include synchronized indications of power consumption and/or playback speed. The synchronization points may be media segment based and/or timestamp based.

In one embodiment, for in-band metadata, the arrival of metadata 211 may indicate when a speed operation should begin and/or end. The metadata 211 may be synchronized with the output media content 210. In another embodiment, unique markers, such as presentation time stamps or picture order counts, may be used to indicate when a speed operation should begin and/or end. In one embodiment, the metadata 211 may include power consumption indications determined by one or more of power estimator 203, integrator 204, and normalizer 205.

The apparatus 200 may include an optional video encoder/compressor 209. The video compressor 209 may compress the power saving media content from speed modifier 206. The compressor 209 may be part of the speed modifier 206.

In one embodiment, apparatus 200 may also be a receiver or a decoder similar to decoder/receiver 120. In one embodiment, apparatus 200 may be a gateway or transceiver. In one embodiment, apparatus 200 may include an optional decoder or decompressor (not shown) that decodes data prior to or in conjunction with modifier 206. In one embodiment, the speed modification may be performed concurrently with the decoding process, e.g., by modifying the number of decoded frames or frame rate of presentation.

In one embodiment, output media content 210 may be similar to power saving media content 102. In one embodiment, output media content 210 may be provided with medatada 211. In one embodiment, metadata 211 may be included in output media content 210. In one embodiment, output media content 210 may be similar to power optimized media content 101. In one embodiment, output media content 210 may be provided for display.

The output media content 210 and the metadata 211 may be provided via a modulator, an output port such as an HDMI port, an Ethernet interface, a communications port, etc. The output media content 210 may include the metadata 211 or may be separate from metadata 211. The metadata 211 may be transmitted or provided via the same or different paths or systems as output media content 210. Alternatively, the metadata 211 may also be modulated and/or assigned to a different channel, frequency, time period, data format or modulation scheme than the output media content 210.

The apparatus 200 may further include processor 220 and memory 221. In one embodiment, the components 201-209 of apparatus 200 may be connected to the processor 220 and the memory 221. The processor 220 may monitor and control the various hardware components for implementing the functions of components 201-209 and other components not shown. In another embodiment, the processor 220 may execute software to perform the various functions for components 201-209 and other components not shown.

The memory 221 may be configured to store information received from one or more of the components 201-209 and other components not shown. The memory 221 may be one or more of a variety of memory types. For example, the memory 221 may be one or more of a Hard Disk Drive (HDD), Dynamic RAM (DRAM), cache, ROM, a RAM, disk storage device (e.g., a magnetic or optical disk storage device), a solid state magnetic device, and so forth.

The memory 221 may store computer executable instructions configured to perform techniques for components 201-209 and other components not shown. The memory 221 may store instructions to be performed by the processor 220. The executable instructions are accessible by the processor 220. The executable instructions may be stored in a RAM or can be stored in a non-transitory computer readable medium. Such non-transitory computer readable medium can comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a ROM, an erasable programmable read-only memory, a portable compact disc or other storage devices that can be coupled directly or indirectly. The medium can also include any combination of one or more of the foregoing and/or other devices as well.

The apparatus 200 may further include other elements (not shown), as readily contemplated by one of skill in the art, as well as omit certain elements. For example, various other input devices and/or output devices can be included, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the apparatus 200 are readily contemplated by one of ordinary skill in the art given the teachings of the present disclosure provided herein.

Further, it is to be appreciated that the apparatus 200 may execute techniques disclosed herein. For example, the apparatus 200 may perform in whole or in part one or more of the method(s) described in connection with FIG. 4A.

Figure 2B:
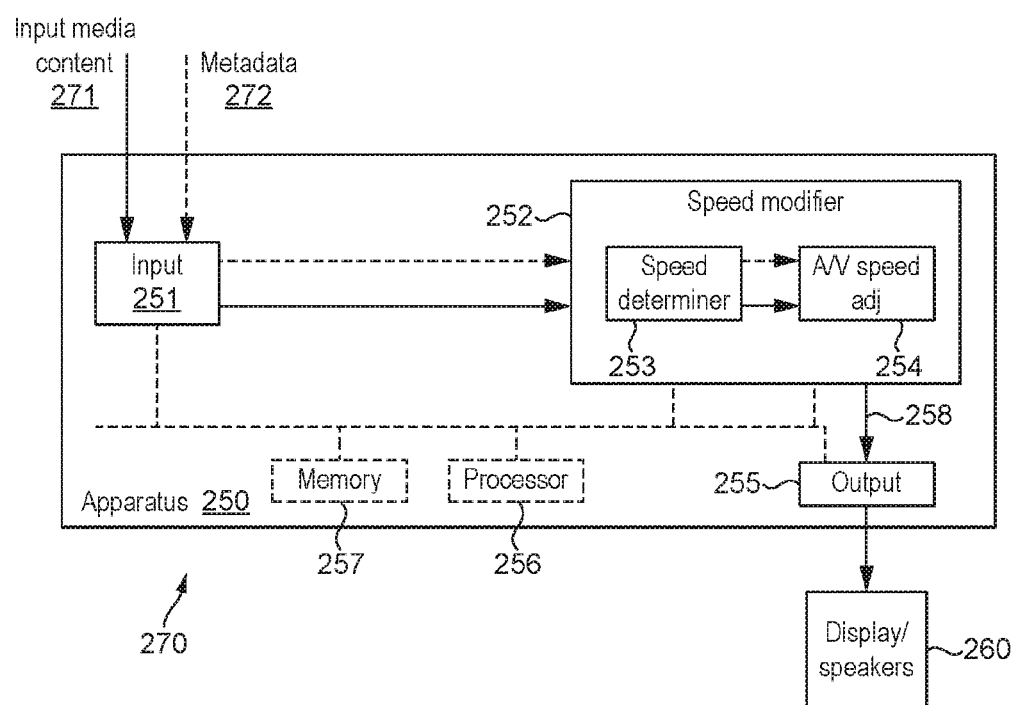
FIG. 2B illustrates a schematic diagram of an exemplary receiver system in accordance with an embodiment of the present disclosure.

FIG. 2B illustrates a schematic diagram of a receiver system 270 in accordance with an aspect of the present disclosure, including apparatus 250 and display/speakers 260. Display/speakers 260 may be optional, bypassed or removed. Apparatus 250 may be an apparatus capable processing instructions and receiving information. The apparatus 250 may be similar to the apparatus 120 described in connection with FIG. 1. For example, the apparatus 250 may be a receiver, a decoder, or a consumer device. The apparatus 250 may receive input media content 271 similar to output media content 210. Apparatus 250 may also receive metadata 272 similar to metadata 211.

The apparatus 250 includes an input interface 251. The input interface 251 may be a tuner, demodulator, video input terminal, bus, connector, input buffer, communications port, and the like. The apparatus 250 may receive the input media content 271 via input interface 251. The apparatus 250 may also optionally receive the input media content 271 and the metadata 272 via input interface 251. In one embodiment, the input media content 271 and the metadata 272 may be determined in accordance with the principles described in connection with FIG. 2A (e.g., 210 and 211, respectively). In one embodiment, the input media content 271 and metadata 272 may be received as described in connection with FIG. 1 (e.g., 102 and 103, respectively).

The apparatus 250 may include a speed modifier 252. The speed modifier 252 may include a speed determiner 253 and an audio/video ("A/V") speed adjuster 254. In one embodiment, the speed determiner 253 and A/V speed adjuster 254 may be integrated into the speed modifier 252.

The speed determiner 253 may determine speed and/or modified playout times for the input media content 271. In one embodiment, the speed determiner 253 may determine the speed and/or modified playout times for each media segment based on the received metadata 272. In one embodiment, the speed determiner 253 may analyze the metadata 272 to obtain the power consumption indications for each media segment of the input media content 271. In another embodiment, the speed determiner 253 may analyze the metadata 272 to determine a speed for each of the media segments of the input media content 271. In one embodiment, the speed determiner 253 may determine the speed and/or modified playout times for each media segment by selecting between power saving versions of that media segment. In another embodiment, the speed modifier 252 and/or the speed determiner 253 may receive media content that already has modified speeds to optimize or adjust, or save power of the media content.

In another embodiment, the speed modifier 252 may further include a media segmenter, a power estimator, an integrator, and/or a normalizer to determine how to provide a power optimized or adjusted media content (e.g., 104). In one embodiment, the media segmenter, the power estimator, the integrator, and/or the normalizer may be similar to the media segmenter 202, the power estimator 203, the integrator 204 and the normalizer 205 described in connection with apparatus 200 in FIG. 2A. In one embodiment, the A/V adjuster 254 may modify the media content in accordance with the principles described in connection with A/V adjuster 208 of FIG. 2A.

In one embodiment, apparatus 250 may also be a receiver or a decoder similar to decoder/receiver 120. In one embodiment, apparatus 250 may be a gateway or transceiver. In one embodiment, apparatus 250 may include an optional decoder or decompressor (not shown) that decodes data prior to or in conjunction with modifier 252. In one embodiment, the speed modification may be performed concurrently with the decoding process, e.g., by modifying the number of decoded frames or frame rate of presentation.

In one embodiment, a utility service provider may provide dynamic rate information (e.g., price per kilowatt hour) to apparatus 250 in order for it to adaptively control a power saving algorithm. Apparatus 250 may modify media content based on a current energy usage. Apparatus 250 can be controlled by another home appliance. Apparatus 250 may perform power saving determinations based on parameters provided by a service provider that may optimize both or either of power consumption and user experience. Apparatus 250 may integrate power consumption information with home power consumption or room lighting to improve experience while also reducing energy usage.

The speed modifier 252 may output power optimized or adjusted media content 258 to an optional output interface 255. Power optimized media content 258 may be similar to power optimized media content 104 or output media content 210. The output interface 255 may be a modulator, an output port such as an HDMI port, or a communications port. The output interface 255 may output power optimized media content (such as video content) to a display device and/or speakers 260. Accordingly, the power optimized media content may be provided to a user for viewing in an energy saving manner.

The apparatus 250 may further include processor 256 and memory 257. In one embodiment, the components 251-255 of apparatus 250 may be connected to the processor 256 and the memory 257. The processor 256 may monitor and control the various hardware components for implementing the functions of components 251-255. In another embodiment, the processor 256 may execute software to perform various functions for components 251-255.

The memory 257 may be configured to store information received from one or more of the components 251-255. The memory 257 may be one or more of a variety of memory types. For example, the memory 257 may be one or more of an HDD, DRAM, cache, ROM, a RAM, disk storage device (e.g., a magnetic or optical disk storage device), a solid state magnetic device, and so forth.

The memory 257 may store computer executable instructions configured to perform techniques for components 251-255. The memory 257 may store instructions to be performed by the processor 256. The executable instructions are accessible by the processor 256. The executable instructions may be stored in a RAM or can be stored in a non-transitory computer readable medium. Such non-transitory computer readable medium can comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a ROM, an erasable programmable read-only memory, a portable compact disc or other storage devices that can be coupled directly or indirectly. The medium can also include any combination of one or more of the foregoing and/or other devices as well.

The apparatus 250 may further include other elements (not shown), as readily contemplated by one of skill in the art, as well as omit certain elements. For example, various other input devices and/or output devices can be included, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the apparatus 250 are readily contemplated by one of ordinary skill in the art given the teachings of the present disclosure provided herein.

Further, it is to be appreciated that the apparatus 250 may execute techniques disclosed herein. For example, the apparatus 250 may perform in whole or in part one or more of the method(s) described in connection with FIG. 4B.

Figure 3:
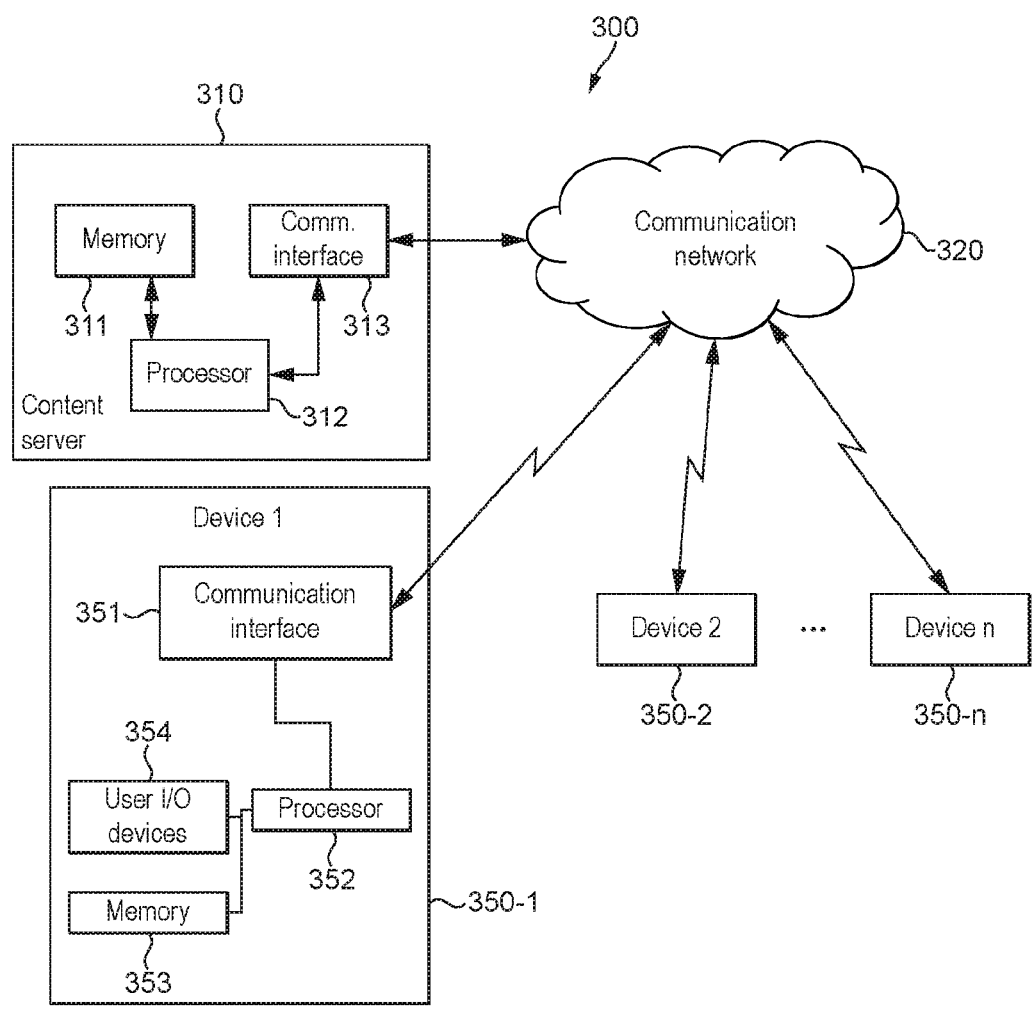
FIG. 3 illustrates a schematic diagram of an exemplary system in accordance with an embodiment of the present disclosure.

FIG. 3 illustrates an exemplary system 300 in accordance with the present disclosure. As illustrated, system 300 is an example in accordance with the present disclosure that includes communication network 320. The communication network 320 may be a communication network such as the internet, a wide area network (WAN), and/or a local area network (LAN). The communication network 320 may also include a broadcast network via cable, satellite, phone lines, power lines or other communication medium. Thereby, system 300 allows for the streaming, broadcasting, uploading and/or downloading of media content via the communication network 320.

The system 300 may include a content server 310. The content server 310 may receive requests from one or more of devices 350-1 to 350-n. The content server 310 may transmit media content such as movies or TV shows for streaming or downloading. The devices 350-1 to 350-n may communicate with the content server 310 over the communication network 320.

The content server 310 may transmit information such as data, web pages, media contents, etc. The content server 310 may provide additional processing of information when the processing is not available and/or capable of being conducted on the local user devices 350-1 to 350-n.

In one embodiment, the content server 310 includes a memory 311, a processor 312 and a communication interface 313. The content server 310 may provide media content and its associated metadata. The media content and associated metadata may be stored in the memory 311 and processed by the processor 312. The memory 311 may be non-transitory storage media, such as one or more hard drives and/or other suitable memory devices. The communication interface 313 may allow the content server 310 to transmit data via the communication network 320.

In one embodiment, the content server 310 may be similar to apparatus 110 described in connection with FIG. 1. In another embodiment, the content server 310 may be similar to the apparatus 200 described in connection with FIG. 2A.

The devices 350-1 to 350-n may be devices for receiving the media content. In one embodiment, such devices may include a set-top box, a gateway, a computer, a laptop, a tablet, a cellphone, etc. In one embodiment, device 350-1 illustrates a detailed block diagram of an exemplary user device. The device 350-1 includes a communication interface 351, processor 352, a memory 353, and an option user I/O interface 354. The communication interface 351 allows for communication, e.g., receiving of information, from the communication network 320. The processor 352 may process the power saving aspects for providing received media content information. The memory 353 may represent both a transitory memory such as RAM, or a non-transitory memory such as a ROM, a hard drive or a flash memory, for processing and storing different files and information.

In one embodiment, the devices 350-1 to 350-*n* may be similar to apparatus 120 described in connection with FIG. 1. In another embodiment, the devices 350-1 to 350-*n* may be similar to the apparatus 250 described in connection with FIG. 2B. In yet another embodiment, the devices 350-1 to 350-*n* may be similar to the apparatus 200 described in connection with FIG. 2A.

Figure 4A:
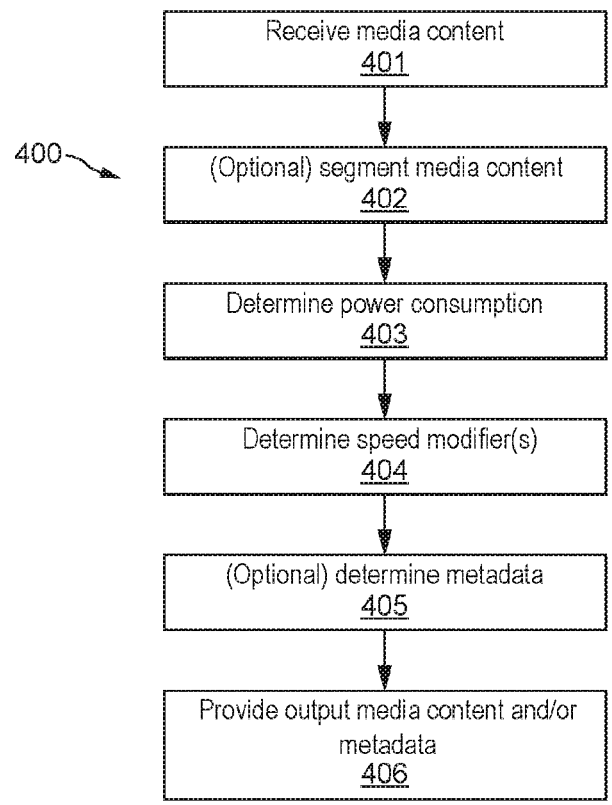
FIG. 4A illustrates a flow diagram of an exemplary method in accordance with an embodiment of the present disclosure.

FIG. 4A illustrates a flow diagram of an exemplary method 400 in accordance with the present disclosure. The method 400 may determine power saving media content. The method 400 may include a block 401 for receiving media content. The media content may be in compressed or non-compressed form. Examples of compressed media content such as content which has been compressed in accordance with MPEG2, H.264, H.265, and any other compression standards. Examples of non-compressed media content include video in RGB formats. The media content may be media content as described in connection with FIG. 1, 101, and FIG. 2A, 212. Block 401 may pass control to block 402.

Block 402 may segment the media content into media segments. In one embodiment, block 402 may segment the media content in accordance with the principles described in connection with media segmenter 202 of FIG. 2A. Block 402 may pass control to block 403. In one embodiment, block 402 may be optional. In one embodiment, block 402 may be bypassed or removed.

Block 403 may determine power consumption for media segments. In one embodiment, block 403 may determine power consumption based on the luminance value of pixels of each media segment. Block 403 may determine power consumption in accordance with the principles described in connection with components 203-205 of FIG. 2A. Block 403 may pass control to block 404.

Block 404 may determine speed modifications in accordance with the present disclosure. In one embodiment, block 404 may determine a modified playout time corresponding to the respective content of the plurality of the portions of the media content. In one embodiment, block 404 may determine the speed of a media segment based on power consumption determination(s). In one embodiment, block 404 may determine a modified start and end time for a media segment. In one embodiment, block 404 may determine speed modifications in accordance with the principles described in connection with components 205-208 of FIG. 2A. Block 404 may pass control to block 405.

Block 405 may determine metadata for the media content. Block 405 may determine metadata related to the power consumption determination and the speed modifications determination of block 403 and 404, respectively. In one embodiment, block 405 may determine metadata which indicates media content speeds in accordance with the present disclosure. For example, the metadata may include information regarding the speed for a media segment (e.g., whether the speed is fast, slow or normal). In one embodiment, block 405 may generate metadata that indicates start and end times for a media content segment. In one embodiment, block 405 may determine metadata that may indicate when a speed operation should begin or end. The metadata may further includes indicators relating to one or more of speed, when speed changes are executed, duration of a speed, start of a speed change, and end of a speed change.

In one embodiment, block 405 may determine metadata indicating media content speed versions. For example, metadata may indicate a first "fast" fast version and a second "slow" version of the same media content or media segment. The metadata may provide the flexibility of indicating the various speeds of the media content. For example, a transmitting or encoding device may provide information in the metadata relating to different levels of playback speed adjustments based on content and/or energy rating(s) of media content segments (e.g., video segments). In one embodiment, block 405 may determine metadata in accordance with the principles described in connection with metadata 211 of FIG. 2A and 103 of FIG. 1. Block 405 may pass control to block 406. In one embodiment, block 405 may be optional. In one embodiment, block 405 may be bypassed or removed.

Block 406 may provide the output media content (e.g., 210) and/or metadata (e.g., 211). In one embodiment, block 406 may transmit output media content and metadata. In one embodiment, the output media content may be determined in accordance with the principles described in connection with the output media content 210 of FIG. 2A, power saving media content 102 or power optimized media content 104 of FIG. 1. In one embodiment, block 406 may determine metadata in accordance with the principles described in connection with metadata 211 of FIG. 2A or metadata 103 of FIG. 1. In one embodiment, block 406 may transmit or provide the output media content and the metadata in accordance with the principles described in connection with FIG. 2A (output media content 210 and metadata 211) or FIG. 1 (power saving media content 102 and metadata 103).

In one embodiment, block 406 may deliver the metadata in-band with the corresponding media content, or out-of-band as a separate file or separate stream. In one embodiment, block 406 may provide the metadata to downstream devices or receivers.

In one embodiment, block 406 may not provide metadata and may instead only provide output media content. For example, the output media content may be determined by performing actual modification to the media content segment(s) (e.g. by modifying the respective playout times based on the determined power consumption indications). Such modifications may be in response to an external power management signal. The signal may be from a power utility provider, a home appliance and/or a home network. For example, this signal may be sent from the power utility provider at peak power demand time in order to reduce the overall power demand by its customer base.

Figure 4B:
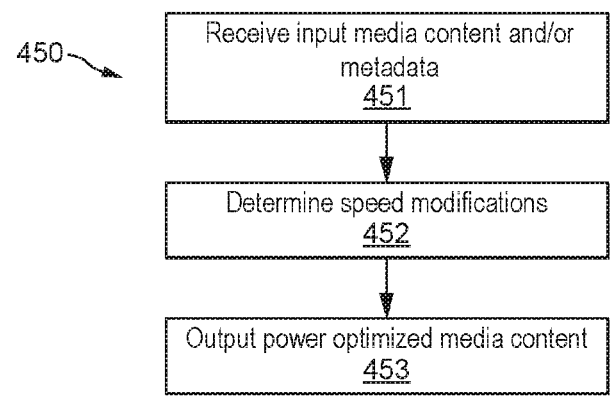
FIG. 4B illustrates a flow diagram of an exemplary method in accordance with an embodiment the present disclosure.

FIG. 4B illustrates a flow diagram of an exemplary method 450 in accordance with the present disclosure. The method 450 may include a block 451 for receiving input media content (e.g., 271, 102) and/or metadata (e.g., 272, 103). Block 451 may process received input media content in accordance with the principles described in connection with input interface 251 of FIG. 2B or decoder/receiver 120 of FIG. 1. The input media content and metadata may be similar to output media content 210 and metadata 211, or to power saving media content 102 and metadata 103. Block 451 may pass control to block 452.

Block 452 may determine speed modifications in accordance with the present disclosure. In one embodiment, block 452 may determine a modified playout time corresponding to the respective content of a plurality of the portions of the media content. In one embodiment, block 452 may determine a modified start and end time for a media content segment. For example, block 452 may determine a faster or slower speed than the normal speed of the media content.

Block 452 may determine speed modifications as described in connection with components 252-254 described in connection with FIG. 2B.

In one embodiment, block 452 may determine media content speed based on metadata. In one embodiment, block 452 may determine the speed of a segment based on the power consumption metadata indications. In one embodiment, block 452 may utilize the metadata to control the speed of displaying media content. In one embodiment, the speed modifications based on metadata may be determined in accordance with the principles described in connection with components 252-254 of FIG. 2A.

In one embodiment, the metadata may be optional and block 452 may instead only receive power saving media content. The received power saving media content may already contain modified speed playout time indications.

Block 453 may output power optimized or adjusted media content (e.g., 104, 210). The power optimized media content may be provided for display, e.g., display 260.

Methods 400 and 450 of FIGS. 4A and 4B may be implemented as a computer program product comprising computer executable instructions which may be executed by a processor. The computer program product having the computer-executable instructions may be stored in the respective non-transitory computer-readable storage media of the respective above mentioned devices.

Figure 5:
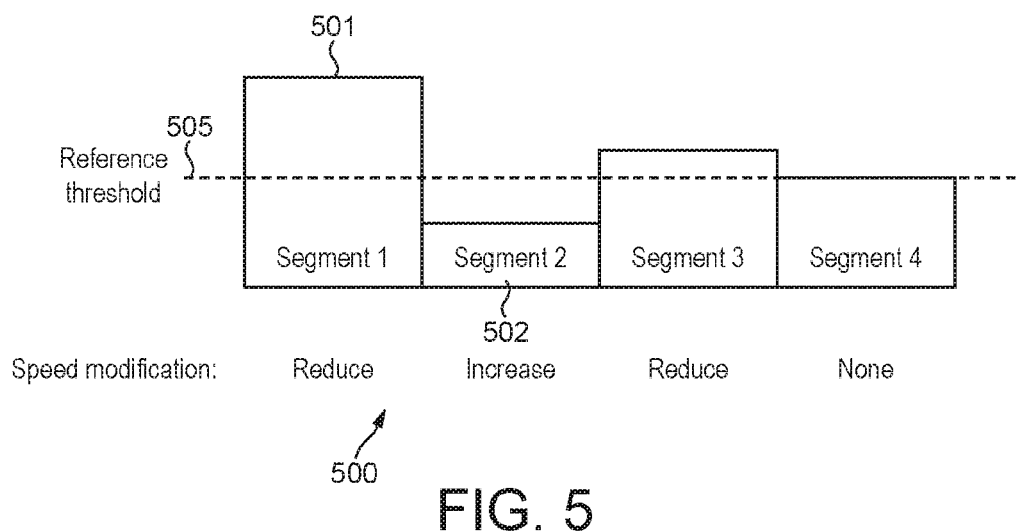
FIG. 5 illustrates an exemplary plot diagram of a modified playout time determination for a media content in accordance with an embodiment the present disclosure.

FIG. 5 illustrates an example of a plot diagram 500 illustrating modified playout time determination(s) for media content in accordance with an aspect of the present disclosure. In another embodiment, FIG. 5 may be modified to illustrate modified speed determination(s) in accordance with the present disclosure.

FIG. 5 illustrates a reference threshold value 505 illustrating a reference power consumption. The reference threshold 505 may be selected by a user or may be determined (e.g., based on average power value of frames of video content, such as a whole movie, TV show). Modified media content playout times may be determined based on the reference threshold 505. The modified playout times may be determined in accordance with the principles described in connection with FIGS. 1-4. If a media segment's power consumption is larger than the reference threshold 505, the media segment's playout time may be reduced, (see, e.g., segment 1 (501)). On the other hand, if a media segment's power consumption is lower than the reference threshold 505, the media segment's playout time may be increased, (see, e.g., segment 2 (502)). FIG. 5 further illustrates a segment 3 that is above the reference threshold 505 (thus its media playout time may be reduced) and a segment 4 that is at the reference threshold (thus its media playout time may be kept the same). In FIG. 5, a speed modification indicating increase (or reduce) may imply, e.g., a 5% speed increase (or reduction).

Figure 6:
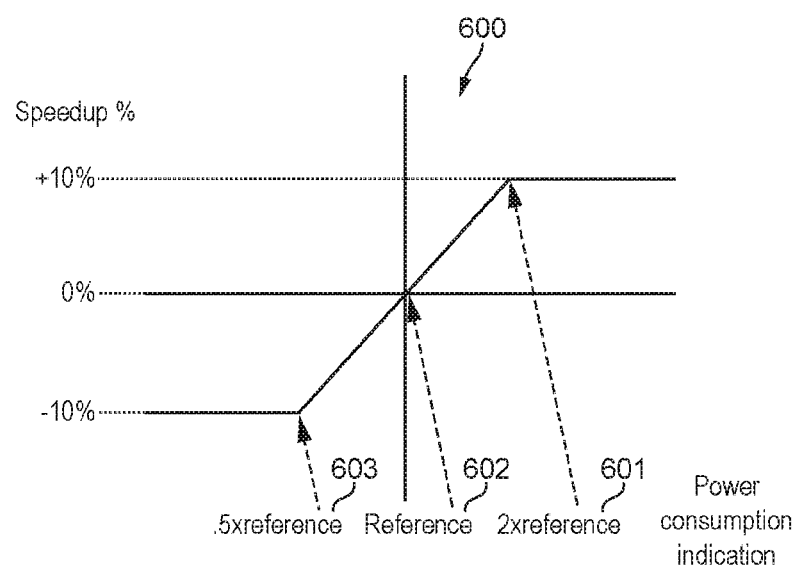
FIG. 6 illustrates an exemplary diagram of a speed modification transfer function in accordance with an embodiment of the present disclosure.

FIG. 6 illustrates an exemplary speed modification transfer function 600 in accordance with an aspect of the present disclosure. The transfer function 600 indicates the amount of modifications to media content play out speed versus the unmodified media play out speed to achieve determined power consumption over the duration of media content playout. FIG. 6 further illustrates exemplary thresholds 601, 602 and 603 of media content segments. The x axis of the transfer function 600 indicates power consumption. The y axis of the transfer function 600 indicates percentage of media content speed changes. As shown in FIG. 6, threshold 602 may be a reference threshold corresponding to a first media segment. A reference threshold may indicate desired power consumption. The power consumption of the threshold 601, corresponding to a second media segment, is twice that of the reference threshold 602. Therefore, the playout speed of the threshold 601 is increased by 10% relative to the playout speed of the reference threshold 602. The power consumption of the threshold 603, corresponding to a third media segment, is half that of the reference threshold 602. Therefore, the playout speed of the threshold 601 is decreased by 10% relative to the playout speed of the reference threshold 602. In one embodiment, the transfer function 600 allows for maximum adjustments of ±10% to the playout speeds. However, ranges of adjustments may be utilized for transfer function 600 or any other power transfer function. In one embodiment, the range of adjustment may be set by a user or may be determined based on provided parameters. In one embodiment, a speed modifier may adjust or normalize the modified playout times corresponding to the respective contents so that a total playout time of the complete video content appears to a viewer to be essentially unmodified. The "aggressiveness" of speed modification may be controlled by at least one of shifting the reference threshold, changing the slope of the transfer characteristic, changing the maximum range of allowable speeds, or a combination thereof.

An aspect of the present disclosure is directed to an already slowed-down version of the media content 102, 210, 271 sent along with metadata 103, 211, 272 by transmitter 110, 200 that may indicate to receiver 120, 250 when (and how much) to speed up certain segments. In one embodiment, the metadata may be separately provided, e.g., as a file. The media content delivered to the receiver 120, 250 may be a higher temporal resolution, higher-bandwidth version of the original media content. For example, a 10% slow down means that the encoded number of frames of the transmitted content may be increased by 10% such that for every 10 frames in the source media content 11 frames are encoded and transmitted. Metadata delivered with the higher temporal resolution media content may optionally indicate to decoder/receiver 120, 250 how the media content should be processed in order to recover 10 frames for display from every 11 frames received. The decoder/receiver 120, 250 may drop or decimate frames or implement some method of frame rate conversion in order to recover the ten frames for display. In this mode, power consumption may start at a maximum, and may come down as the content is sped up in certain places to improve the power consumption.

Figure 7A:
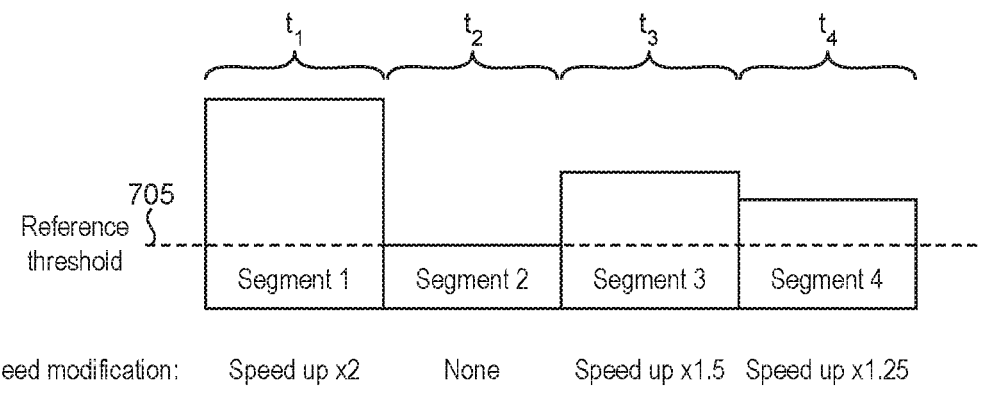
FIG. 7A illustrates an exemplary plot diagram of a modified playout time determination for a media content in accordance with an embodiment of the present disclosure.

FIG. 7A illustrates an exemplary plot diagram 700 of a modified playout time determination for a media content in accordance with an aspect of the present disclosure. FIG. 7A illustrates a reference threshold value 705 associated with a reference power consumption. The reference threshold 705 may be selected by a user or may be determined (e.g., based on average power value of frames of video content, such as a whole movie, TV show). Modified media content playout times may be determined based on the reference threshold 705. The modified playout times may be determined in accordance with the principles described in connection with FIGS. 1-6 and with the description of FIG. 5. FIG. 7A describes a case of an already (and possibly highly) sloweddown version of a media content sent to a receiver. If a media segment's power consumption is larger than the reference threshold 705, the playout time of the media segment may be reduced. Most segments in FIG. 7A have a power consumption above the reference threshold 705 and are therefore associated with speed modifications higher than the original or normal speed of the media content. For example, segment 1 of time duration t1 is to be sped up by a factor of 2, segment 3 of time duration t2 is to be sped up by a factor of 1.5 and segment 4 of time duration t4 is to be sped up by a factor of 1.25. FIG. 7A further illustrates a segment 2 of time duration t2 that is at the reference threshold (thus its media playout time may be kept the same). In one embodiment, and without loss of generality, different formats of metadata may be selected, either sending no metadata (as in segment 2) or metadata with a factor of 1 to maintain the same playout time for the segment.

Figure 7B:
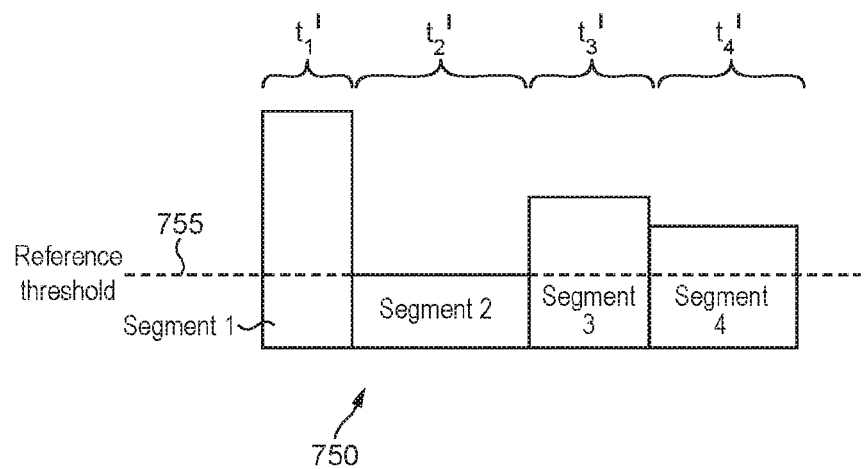
FIG. 7B illustrates an exemplary plot diagram of a media content with a modified playout time in accordance with an embodiment of the present disclosure.

FIG. 7B illustrates an exemplary plot diagram 750 of the media content of FIG. 7A with a modified playout time in accordance with an embodiment of the present disclosure. By applying the speed modifications to the content of FIG. 7A, segments 1, 3 and 4 now have a shorter time duration since t1'=t1/2, t3'=t3/1.5 and t4'=t4/1.2. Segment 2 remains with the same time duration, that is, of t2'=t2. In practical implementations, the final time duration of each segment may be approximately the desired value, e.g., within a +/−5% margin of the desired value (e.g., t1'~t1/2). It should be noted that FIGS. 7A and 7B are not drawn with exactly the same scales and that the figures approximate the exact time duration values indicated above.

Using a high-quality (and high-bandwidth) version, which may be equivalent to a slowed down version of the media content (e.g., FIG. 7A) may be preferable to, e.g., many cinephiles, in that they are willing to accept the higher bandwidth and longer download times to get higher temporal resolution content.

An aspect of the present disclosure is directed to an already sped-up version of the media content 102, 210, 271 sent along with metadata 103, 211, 272 by transmitter 110, 200 that may indicate to receiver 120, 250 when (and how much) to slow down certain segments. In one embodiment, the metadata may be separately provided, e.g., as a file. The media content delivered to the receiver 120 may be a lower temporal resolution, lower-bandwidth version of the original source media content. For example, a 10% speed up means that the encoded number of frames of the transmitted content may be reduced by 10% such that for every 10 frames in the source media content only 9 frames are encoded and transmitted. Metadata delivered with the lower temporal resolution media content may optionally indicate to decoder/receiver 120, 250 how the media content should be processed in order to recover 10 frames for display from every 9 frames received. The decoder/receiver 120, 250 may repeat or interpolate frames or implement some method of frame rate conversion in order to recover the ten frames for display. In this mode, power consumption may start at a minimum, but may rise as the media content is slowed down in certain places to enhance the viewing experience.

Figure 8A:
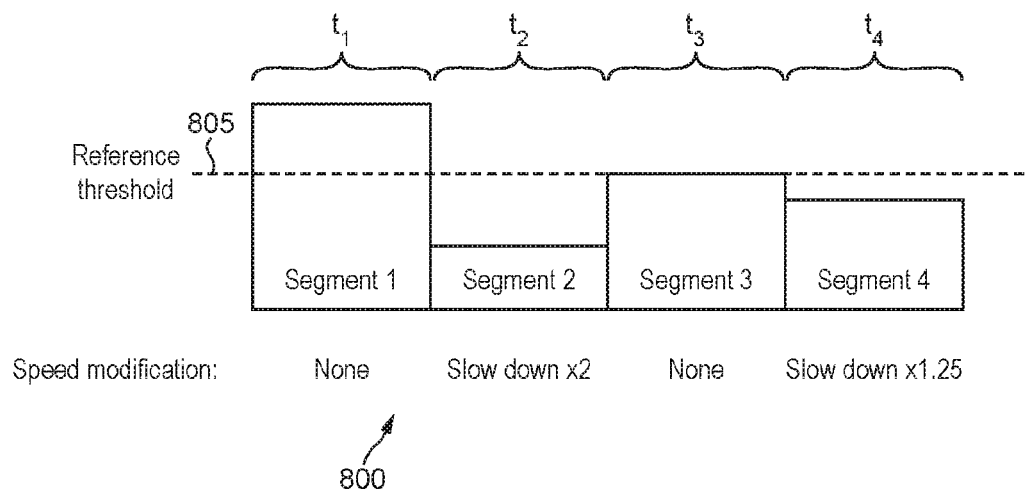
FIG. 8A illustrates an exemplary plot diagram of a modified playout time determination for a media content in accordance with an embodiment of the present disclosure.

FIG. 8A illustrates an exemplary plot diagram 800 of a modified playout time determination for a media content in accordance with an embodiment of the present disclosure. FIG. 8A illustrates a reference threshold value 805 associated with a reference power consumption. The reference threshold 805 may be selected by a user or may be determined (e.g., based on average power value of frames of video content, such as a whole movie, TV show). Modified media content playout times may be determined based on the reference threshold 805. The modified playout times may be determined in accordance with the principles described in connection with FIGS. 1-6 and with the description of FIG. 5. FIG. 8A describes a case of an already (and possibly highly) sped-up version of a media content sent to a receiver. If the power consumption of a media segment is smaller than the reference threshold 805, the media segment's playout time may be reduced. Most segments in FIG. 8A have a power consumption below the reference threshold 805 and are therefore associated with speed modifications lower than the original or normal speed of the media content. For example, segment 2 of time duration t2 is to be slowed down by a factor of 2 and segment 4 of duration t4 is to be slowed down by a factor of 1.25. FIG. 8A further illustrates a segment 1 of duration t1 that is above the reference threshold and segment 3 of duration t3 that is at the reference threshold and do not require speed modification (thus, their media playout time may be kept the same). Segment 1 does not require speed modification because it is already a sped up version of the original content and should not be further sped up.

Figure 8B:
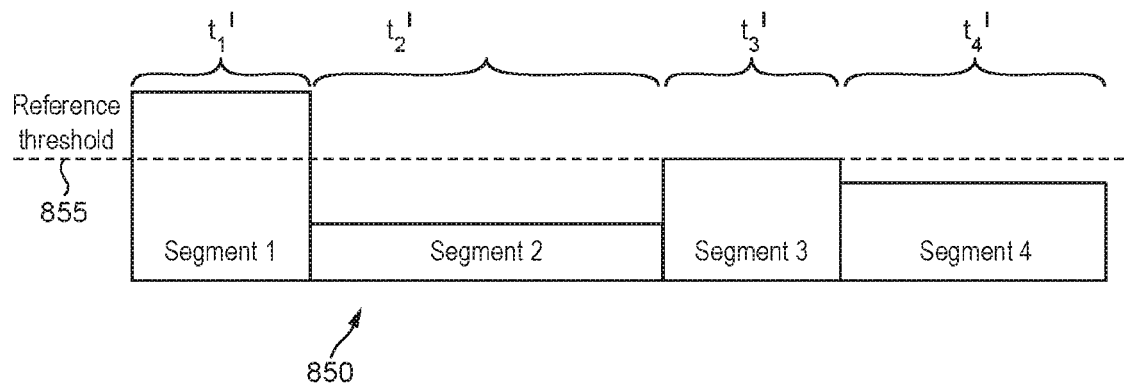
FIG. 8B illustrates an exemplary plot diagram of a media content with a modified playout time in accordance with an embodiment of the present disclosure.

FIG. 8B illustrates an exemplary plot diagram 850 of the media content of FIG. 8A with a modified playout time in accordance with an embodiment of the present disclosure. By applying the speed modifications to the content of FIG. 8A, segments 2 and 4 now have a longer time duration since t2'=2*t2 and t4'=1.2*t4. Segments 1 and 3 remain with the same time duration, that is, t1'=t1 and t3'=t3. In practical implementations, the final time duration of each segment may be approximately the desired value, e.g., within a +/−5% margin of the desired value (e.g., t2'~2*t2). It should be noted that FIGS. 8A and 8B are not drawn with exactly the same scales and that the figures approximate the exact time duration values indicated above.

Using a low-bandwidth (and low temporal resolution) version, which may be equivalent to a sped up version of the media content (e.g., FIG. 8A) may be desirable to multiple system operators (MSO, e.g., Comcast™ or DirecTV™), in that the operators may be able to fit more media content into their available bandwidth.

In a receiver, a certain amount of content needs to be buffered before a speed-up may be performed on the content. Hence, a low-bandwidth version may be more desirable for live content, since the version may arrive in real-time at a faster pace than it is played out. As a result, the amount of time required to store data in a (big enough) buffer may be drastically reduced compared to higher bandwidth versions.

In one embodiment of the present disclosure, the first X minutes of the media content may be presented in real-time or slowed down, that is, the metadata implies a no change or slow down. As a result, the buffer acquisition is optimized (i.e., sped up), potentially lowering the power savings slightly, but, for example, making a "live TV" scenario more of a realistic possibility. In this scenario, speeding up the first X minutes of presentation may be avoided.

When the frame rate or number of frames of the received video is decoupled from the presentation frame rate (i.e. raster frame rate) or number of frames, there may be input buffer level issues to consider at the receiver/decoder 120, 250. When dealing with live content, the content may only be encoded and delivered as it occurs. In the case of the lower temporal resolution media content mentioned above, it must be recognized that there is a form of temporal compression that occurs at the encoder and broadcast/transmitter side 110, 200. In other words, considering the 10% speed-up example, it takes 10 raster frame periods to produce the equivalent of 9 frames of video. This means that every frame of the encoded video represents more than one raster frame time as captured at the site of the live event. So, even if the video data is delivered to the receiver as soon as possible, the first frame of video cannot be received in one raster frame time. In one embodiment, a buffering scheme is implemented at receiver 120, 250 which recognizes that some amount of data must accumulate prior to the start of decoding. The buffer level required for start of decoding may be determined by both the buffering rules of the video compression format as well as the level of 'speed-up' implemented in the power saving scheme.

Figure 9:
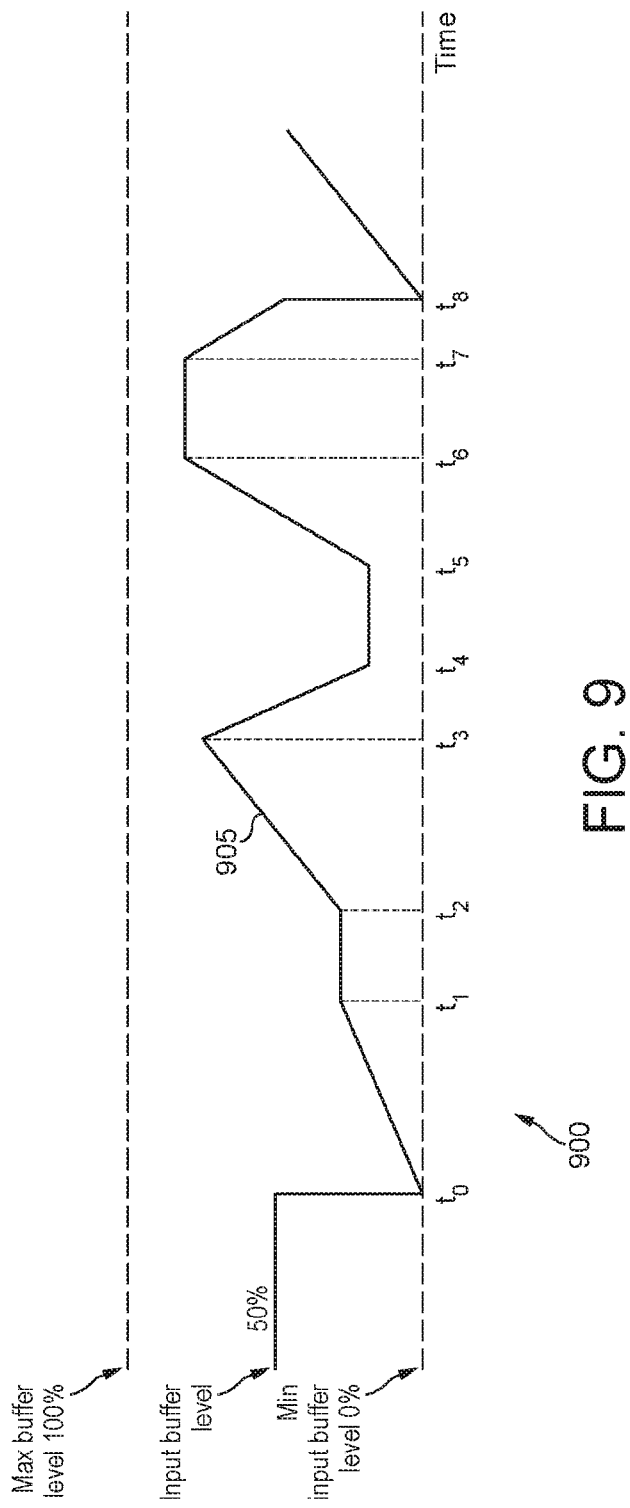
FIG. 9 illustrates an exemplary plot diagram of a receiver buffer level over time in accordance with an embodiment of the present disclosure.

FIG. 9 illustrates an exemplary plot diagram 900 of a receiver buffer level over time in accordance with an aspect of the present disclosure. Following a channel change, the input buffer of receiver 120, 250 may be empty, e.g., at time t0. The normal acquisition process following channel change requires the decoder to parse the input stream until it finds a random access point at which decoding may begin, e.g., at time t1. In the case of media content for which the metadata indicates a speed-up mode described above, the decoder may need more time to accumulate data in its input buffer than would be needed if decoding an unmodified stream to avoid buffer underflow. In one embodiment, in order to adapt the decoding process to more quickly reach a level at which sustained decoding can occur (i.e. no buffer underflow), the decoder 120, 250 may choose to start decoding at a slower speed than indicated by the metadata. In other words, if the decoder is required to increase the speed by 10%, it may choose instead to increase the speed by just 8%. This will slow the rate at which the input buffer is drained, allowing the buffer level to rise to a level at which steady state decoding may begin. At this point, the decoder may then revert to a frame rate increase consistent with the difference between the encoded frame rate and the raster frame rate. Similarly, if the decoder is required to decrease the speed by 10%, it may decrease the speed by 15% to achieve steady state sooner. In one embodiment, the buffer level for steady state is a function of the speed requirements of a first portion of the media segment, for example, the segments comprising the initial 10% of the media content.

According to an aspect of the present disclosure, in order to serve the interest of lower power consumption, it should be noted that one of the goals of changing the number of frames is to reduce the time duration (or playout time) of high power scenes. In other words one media segment may be encoded with 10% fewer frames than would be expected at a nominal raster frame rate while another scene might be encoded with 10% more frames than would be expected at a nominal raster frame rate. When decoded and displayed at a nominal raster frame rate, the media segment with 10% fewer frames occupies less raster time than the time it represents in the original source video or media content, while the media segment with 10% more frames occupies more time than it represents in the original video. In one embodiment, it is possible to achieve this same goal at the receiver 120, 250 while delivering media data encoded at a constant frame rate. In this case, the content might be encoded at a nominal frame rate, for example, and metadata delivered with the content may guide the playout time of the video. For portions of the video which represent relatively higher power scenes or images, a frame skipping/dropping or frame skipping/dropping plus filtering algorithm may be used in order to reduce the number of frames that represent this video portion. Metadata may mark the beginning and end of the higher power segment, as well as the amount of frame number reduction necessary in order to achieve the target power reduction. In a similar way, metadata may also mark the beginning and end of lower power video segments. The metadata may also provide an indication of the amount of number of frames expansion needed in order to cause the lower power scene to occupy a larger number of raster frame times in order to achieve the target power reduction.

Such a metadata guided playback scheme implies a variable decoding rate. During the higher power video segments, the decoder 120 consumes frames at a faster than real-time rate in order to allow these frames to occupy fewer raster cycles than would be the case for a real-time playback speed. During the lower power video segments, the decoder consumes frames at a slower than real-time rate in order to allow these frames to occupy more raster cycles than would be the case for a real-time playback speed. This metadata-driven variation in decoding speed is not accounted for in the normal decoder buffer parameters dictated by the video compression format in use. As such, in one embodiment, the additional input buffer margins needed for this variable decoding speed need to be accounted for at the system level. For example, in a situation during which there is an extended period of high power video content, decoder/receiver 120, 250 is only able to drain its input video data buffer at a faster than real-time rate for a short period of time before it experiences a buffer underflow. A similar situation is true for an extended period of lower power video content. If the decoder consumes data from its input buffer at a slower than real-time rate for an extended period, the input data, arriving continuously at real-time rate, will soon overflow any input buffer of finite size.

In one embodiment of the present disclosure, in order to avoid such a buffer overflow/underflow situation due to the variable decoding rate, metadata may indicate a target buffer level for sustained playback of media content when playback follows the variable decoding rate indicated by the power savings metadata. The target buffer level data is applicable whether the change in speed (either by frame number or frame rate change) is implemented at the encoder 110, 200 prior to delivery to the receiver/decoder 120, 250, or implemented at a receiver/decoder 120, 200, 250 that is receiving unmodified media data. The target buffer level metadata may indicate a buffer level in terms of compressed video frames, megabits, seconds, segments, percentage delta from a nominal buffer level, etc. In FIG. 9, the target buffer level may be achieved at time t1. The receiver 120, 250 may try to manage its local input buffer to reach this buffer level, and once reached, may try to sustain the buffer level. Following time t1, a segment of normal speed is presented at time t1-t2, resulting in a constant buffer level. The target buffer level may be expected to change over time as a function of the frequency and duration of high power and low power video segments. In fact, during periods of high power (e.g., periods t3-t4 and t7-t8 in FIG. 9) and low power video (e.g., period t2-t3 and t5-t6 in FIG. 9), the target buffer level may be expected to change on a frame-by-frame basis as the input buffer level drains or fills in response to the receiver following the metadata directives to play out media data at a faster or slower than real-time rate. As such, in one embodiment, the target buffer level metadata may be updated and sent to the receiver, either in-band or out-of-band, on a regular interval. The update rate of the target buffer level metadata may be at least as often as the target buffer level changes, and potentially more often for a broadcast one-way delivery system in order to allow a receiver to quickly acquire the target buffer level metadata following a channel change.

In a broadcast delivery system, the arrival rate of media data at the receiver may be fixed and generally tracks the rate required for real-time playback. As such, in one embodiment, in order to modify the level of data in the input buffer, the receiver may need to modify the rate at which it extracts data from the buffer. The receiver may already be responding to metadata that directs it to play faster or slower than real-time in order to achieve a target power savings. However, in one embodiment, in order to also achieve and maintain a target buffer level, the receiver may need to consume data from the input buffer at a faster or slower rate than directly indicated by the power savings metadata. For example, the metadata may indicate a segment speed up of 10% and the receiver may instead speed up the segment by 8% in order to prevent possible buffer underflow. Similarly, the metadata may indicate a segment slow down by 10% and the receiver may instead slow down the segment by 8% in order to prevent possible buffer overflow.

The disparity between target buffer level and actual buffer level is likely to be most pronounced immediately following a channel change. In one embodiment, after a channel change, the input buffer level is at zero, as shown in FIG. 9, at time to. The receiver 120, 250 may choose to modify its decoding and playout rate to operate at a decoding and playout rate slightly below what is recommended by the power savings metadata. Operating at a slower than recommended decoding and playback rate will allow, over time, an accumulation of data in the input buffer, eventually reaching the target buffer level. Any reduction in decoding and playout rate may also be limited by user or system level settings that determine a minimum playout speed. The minimum playout speed may ideally be selected to allow a slower than real-time playout that may operate at a rate that appears substantially equivalent to real-time playback by the average viewer. Substantially equivalent may imply a rate within a percentage value of the real-time playback by the average viewer. In one embodiment, the percentage value may be +/−5% of the real-time playback.

In FIG. 9, the buffer has a minimum buffer level of e.g., 0% of data and a maximum buffer level of, e.g., 100% data. It is desirable to avoid the maximum and minimum buffer levels during operation, except for a reset or startup condition. Before time t0, the buffer level 905 is at steady state at level 50%. At time t1, the buffer is reset and a new media content starts being received and stored. After the buffer achieves a threshold at time t1, playback finally starts at normal speed. Normal speed in this case means that the received rate and the playback rate are the same and the buffer level remains constant. At time t2, the receiver slows down the playback speed to 80% of normal speed (based on metadata or its own determination) and the buffer level starts increasing again. At time t3, the receiver speeds up the playback speed to 120% of normal speed and the buffer level starts decreasing again. At time t4, the receiver changes the playback speed to normal speed, that is, 100% and the buffer level remains constant. At time t5, the receiver slows down to 60% of the normal speed and the buffer level increases. At time t6, the receiver changes the playback speed to normal speed and the buffer level remains constant. At time t7, the receiver increases the speed to 120% of normal speed and the buffer level starts decreasing again. At time t8, a buffer reset happens, bringing the buffer level down to 0% again.

According to one aspect of the present disclosure, an apparatus 110, 120, 200, 310, 350_1 for providing power saving information for media content is provided, the apparatus including a processor 220, 312, 352 in communication with at least one input/output interface 201, 313, 351, and at least one memory 221, 311, 353 in communication with the processor, the processor being configured to receive media content including a plurality of media segments, determine a power consumption indicator for a media segment of the plurality of media segments, determine power saving information for the media segment based on the power consumption indicator for the media segment and provide the power saving information. The blocks 201, 203-205 and 207 may also implement the functionalities described above (i.e., receive, determine a power consumption indicator, determine power saving information and provide).

In one embodiment of the apparatus, the processor may determine power consumption, determine power saving information and provide power saving information for more than one media segment or for at least one media segment. In addition, the following embodiments of the apparatus also apply for more than one media segment or for at least one media segment.

In one embodiment of the apparatus, the processor may be further configured to provide the power saving information as metadata 103, 211 to the media content 102, 210.

In one embodiment of the apparatus, the power consumption indicator may be a function of a luminance of the media segment. The power consumption indicator may be determined based on an average or a normalized luminance of the media segment. The power consumption indicator may be determined based on a linear or non-linear function, or a mapping of the luminance of the media segment.

In one embodiment of the apparatus, the processor may be configured to determine power saving information by determining an indicator of playout time for the media segment based on the power consumption indicator for the media segment.

In one embodiment of the apparatus, the indicator of playout time may decrease an average power consumption for the media content, the average power consumption being associated with the original media content.

In one embodiment of the apparatus, the (original) average power consumption may be a function of the power consumption indicator and an original playout time for the media segment. For example, the average power consumption may be a weighted sum of the power consumption indicator of each media segment included in the media content, weighted by the respective media segment playout time percentage with respect to the total playout time of the content. The playout time percentage of a media segment is its playout time divided by the total playout time of the media content.

In one embodiment of the apparatus, the processor may be further configured to determine another power consumption indicator for another media segment of the plurality of media segments and determine another power saving information for the another media segment based on the another power consumption indicator for the another media segment. In one embodiment, the processor may further determine another power saving information by being further configured to determine another indicator of playout time for the another media segment.

In one embodiment of the apparatus, the processor may be further configured to determine another indicator of playout time for another media segment wherein the another indicator of playout time may indicate a longer playout time than an original playout time for the another media segment and the indicator of playout time may indicate a shorter playout time than the original playout time for the media segment. Alternately, in one embodiment, the another indicator of playout time may indicate a shorter playout time than an original playout time for the another media segment and the indicator of playout time may indicate a longer playout time than the original playout time for the media segment.

In one embodiment of the apparatus the indicator of playout time and the another indicator of playout time when applied to the media segment and the another media segment, respectively, may result in substantially the same playout time for the media content as an original playout time for the media content.

In one embodiment of the apparatus, the indicator of playout time may be a playout speed at which to play the media segment. The playout speed may be a frame rate of presentation of the media content.

In one embodiment of the apparatus, the indicator of playout time may be a number of frames into which to convert the media segment.

According to an aspect of the present the disclosure, an apparatus 110, 120, 200, 250, 310, 350_1 for receiving power saving information for media content is described, the apparatus including a processor 220, 256, 312, 352 in communication with at least one input/output interface 201, 251, 313, 351; and at least one memory 221, 257, 311, 353 in communication with the processor, the processor being configured to receive power saving information for a media segment in a media content including a plurality of media segments, apply the power saving information to the media segment to generate a power adjusted media content, and provide the power adjusted media content. The blocks 207-208, or 251-254 (and optionally, 255) may also implement the functionalities described above (i.e., receive, apply and provide). The power adjusted media content may be, e.g., power optimized media content 104, output media content 210 or power optimized media content 258. The power adjusted media content may represent savings in power consumption with respect to the original media content.

In one embodiment of the apparatus, the processor may receive power saving information and apply power saving information for more than one media segment (or for at least one media segment) to generate the power adjusted media content. In addition, the following embodiments of the apparatus also apply for more than one media segment or for at least one media segment.

In one embodiment of the apparatus, the power saving information may be received as metadata 103, 272 to the media content 102, 271.

In one embodiment of the apparatus, the power saving information may include an indicator of playout time for the media segment.

In one embodiment of the apparatus, the indicator of playout time may be based on a power consumption indicator for the media segment.

In one embodiment of the apparatus, the power consumption indicator may be a function of a luminance of the media segment. The power consumption indicator may be determined based on an average or a normalized luminance of the media segment. The power consumption indicator may be determined based on a linear or non-linear function, or a mapping of the luminance of the media segment.

In one embodiment of the apparatus, the indicator of playout time may decrease an average power consumption for the media content. In one embodiment of the apparatus, the average power consumption may be a function of the power consumption indicator and an original playout time, for the media segment. For example, the average power consumption may be a weighted sum of the power consumption indicator of each media segment included in the media content, weighted by the respective media segment playout time percentage with respect to the total playout time of the content. The playout time percentage of a media segment is its playout time divided by the total playout time of the media content.

In one embodiment of the apparatus, the processor may be further configured to receive another power saving information for another media segment in a media content including another indicator of playout time for the another media segment, wherein the another indicator of playout time may indicate a longer playout time than an original playout time for the another media segment and the indicator of playout time may indicate a shorter playout time than the original playout time for the media segment. Alternately, in one embodiment, the another indicator of playout time may indicate a shorter playout time than an original playout time for the another media segment and the indicator of playout time may indicate a longer playout time than the original playout time for the media segment.

In one embodiment of the apparatus, the processor may be further configured to apply the another power saving information to the another media segment to generate the power adjusted media content wherein a playout time for the power adjusted media content may be substantially the same as a playout time for the media content.

In one embodiment of the apparatus, a playout time for the power adjusted media content is substantially the same as a playout time for the media content.

In one embodiment of the apparatus, the indicator of playout time may be a playout speed at which to play the media segment. The playout speed may be a frame rate of presentation of the media content.

In one embodiment of the apparatus, the indicator of playout time may be a number of frames into which to convert the media segment.

Figure 10:
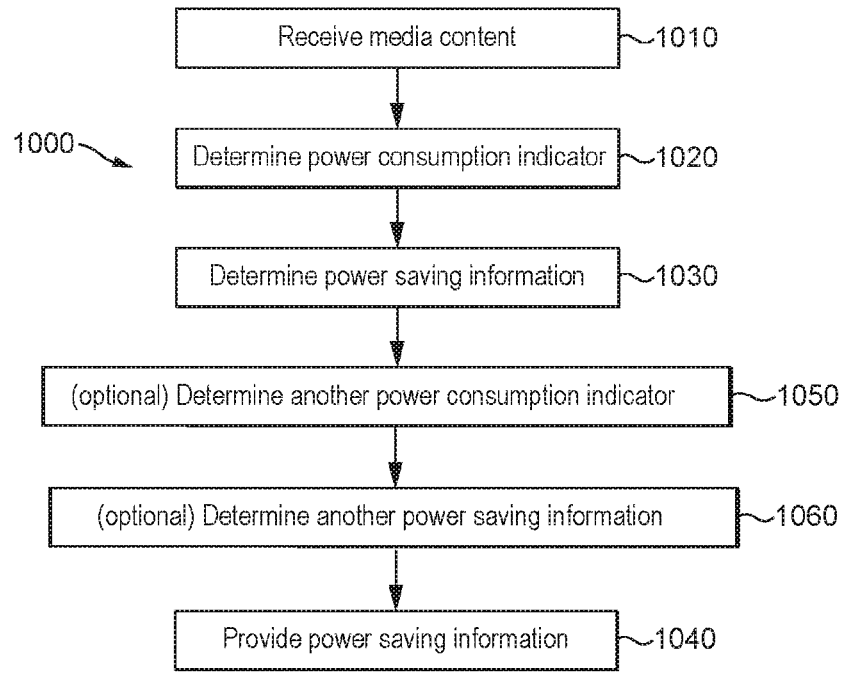
FIG. 10 illustrates a flowchart of an exemplary method of providing power saving information for media content in accordance with an embodiment of the present disclosure.

FIG. 10 illustrates a flowchart 1000 of an exemplary method of providing power saving information for media content in accordance with an aspect of the present disclosure. The method includes, at step 1010, receiving media content including a plurality of media segments. Step 1010 may be performed, e.g., by input interface 201. Then, at step 1020, the method includes determining a power consumption indicator for a media segment of the plurality of media segments. Step 1020 may be performed, e.g., by power estimator 203 (and optionally integrator 204 and normalizer 205). Next, at step 1030, the method includes determining power saving information for the media segment based on the power consumption indicator for the media segment. Step 1030 may be performed by, e.g., speed determiner 207. Finally, at step 1040, the method includes providing the power saving information. Step 1040 may be performed by, e.g., speed determiner 206.

In one embodiment of the method, the steps of determining power consumption, determining power saving information and providing power saving information may be performed for more than one media segment or for at least one media segment. In addition, the following embodiments of the method also apply for more than one media segment or for at least one media segment.

In one embodiment of the method, the providing step may further include providing the power saving information as metadata 103, 211 to the media content 102, 210.

In one embodiment of the method, the power consumption indicator may be a function of a luminance of the media segment. The power consumption indicator may be determined based on an average or a normalized luminance of the media segment. The power consumption indicator may be based on a linear or a non-linear function, or a mapping of the luminance of the media segment.

In one embodiment of the method, the determining power saving information step may further include determining an indicator of playout time for the media segment based on the power consumption indicator for the media segment.

In one embodiment of the method, the indicator of playout time may decrease an average power consumption for the media content.

In one embodiment of the method, the average power consumption may be a function of the power consumption indicator and an original playout time for the media segment. For example, the average power consumption may be a weighted sum of the power consumption indicator of each media segment included in the media content, weighted by the respective media segment playout time percentage with respect to the total playout time of the content. The playout time percentage of a media segment is its playout time divided by the total playout time of the media content.

In one embodiment, the method may further include determining, at step 1050, another power consumption indicator for another media segment of the plurality of media segments and determining, at step 1060, another power saving information for the another media segment based on the another power consumption indicator for the another media segment. Step 1050 may be performed, e.g., by power estimator 203 (and optionally integrator 204 and normalizer 205). Step 1060 may be performed by, e.g., speed determiner 207. In one embodiment, steps 1050 and 1060 may be optional. In one embodiment, steps 1050 and 1060 may be bypassed or removed.

In one embodiment, the determining another power saving information step of the method may further include determining another indicator of playout time for another media segment wherein the another indicator of playout time may indicate a longer playout time than an original playout time for the another media segment and the indicator of playout time may indicate a shorter playout time than the original playout time for the media segment. Alternately, in one embodiment, the another indicator of playout time may indicate a shorter playout time than an original playout time for the another media segment and the indicator of playout time may indicate a longer playout time than the original playout time for the media segment.

In one embodiment of the method, the indicator of playout time and the another indicator of playout time when applied to the media segment and the another media segment, respectively, may result in substantially the same playout time for the media content as an original playout time for the media content.

In one embodiment of the method, the indicator of playout time may be a playout speed at which to play the media segment. The playout speed may be a frame rate of presentation of the media content.

In one embodiment of the method, the indicator of playout time may be a number of frames into which to convert the media segment.

Figure 11:
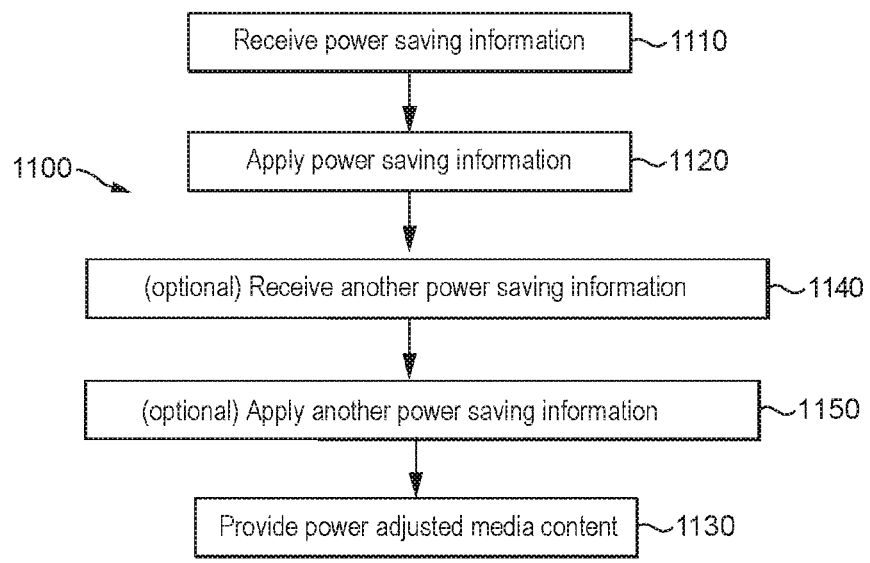
FIG. 11 illustrates a flowchart of an exemplary method of receiving power saving information for media content in accordance with an embodiment of the present disclosure.

FIG. 11 illustrates a flowchart 1100 of an exemplary method of receiving power saving information for media content in accordance with an aspect of the present disclosure. The method includes, at step 1110, receiving power saving information for a media segment in a media content including a plurality of media segments. Step 1110 may be performed, e.g., by speed determiner 207 or input interface 251. Then, at step 1120, the method includes applying the power saving information to the media segment to generate a power adjusted media content. Step 1120 may be performed, e.g., by A/V speed adjuster 208. The power adjusted media content may be, e.g., power optimized media content 104, output media content 210 or power optimized media content 258. Finally, at step 1130, the method includes providing the power adjusted media content. Step 1130 may be performed by, e.g., A/V speed adjuster 208 or output interface 255. The power adjusted media content may represent savings in power consumption with respect to the original media content.

In one embodiment of the method, the steps of receiving power saving information and applying power saving information may be performed for more than one media segment or for at least one media segment to generate the power adjusted media content. In addition, the following embodiments of the method also apply for more than one media segment or for at least one media segment.

In one embodiment of the method, the power saving information may be received as metadata to the media content.

In one embodiment of the method, the power saving information may include an indicator of playout time for the media segment.

In one embodiment of the method, the indicator of playout time may be based on a power consumption indicator for the media segment.

In one embodiment of the method, the power consumption indicator may be a function of a luminance of the media segment. The power consumption indicator may be determined based on an average or a normalized luminance. The power consumption indicator may be based on a linear or a non-linear function, or a mapping of the luminance.

In one embodiment of the method, the indicator of playout time may decrease an average power consumption for the media content.

In one embodiment of the method, the average power consumption may be a function of the power consumption indicator and an original playout time for the media segment. For example, the average power consumption may be a weighted sum of the power consumption indicator of each media segment included in the media content, weighted by the respective media segment playout time percentage with respect to the total playout time of the content. The playout time percentage of a media segment is its playout time divided by the total playout time of the media content.

In one embodiment, the method may further include receiving, at step 1140, another power saving information including another indicator of playout time for another media segment in a media content, wherein the another indicator of playout time may indicate a longer playout time than an original playout time for the another media segment and the indicator of playout time may indicate a shorter playout time than the original playout time for the media segment. Step 11140 may be performed, e.g., by speed determiner 207 or input interface 251. In one embodiment, step 1140 may be optional. In one embodiment, step 1140 may be bypassed or removed. Alternately, in one embodiment, the another indicator of playout time may indicate a shorter playout time than an original playout time for the another media segment and the indicator of playout time may indicate a longer playout time than the original playout time for the media segment.

In one embodiment, the method may further include applying, at step 1150, the another power saving information to the another media segment to generate the power adjusted media content wherein a playout time for the power adjusted media content may be substantially the same as a playout time for the media content. Step 1150 may be performed, e.g., by A/V speed adjuster 208. In one embodiment, step 1150 may be optional. In one embodiment, step 1150 may be bypassed or removed.

In one embodiment of the method, a playout time for the power adjusted media content is substantially the same as a playout time for the media content.

In one embodiment of the method, the indicator of playout time may be a playout speed at which to play the media segment. The playout speed may be a frame rate of presentation of the media content.

In one embodiment of the method, the indicator of playout time may be a number of frames into which to convert the media segment.

Methods 1000 and 1100 of FIGS. 10 and 11, respectively, may be implemented as a computer program product comprising computer executable instructions which may be executed by a processor. The computer program product having the computer-executable instructions may be stored in the respective non-transitory computer-readable storage media of the respective above mentioned devices.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette (CD), an optical disc (such as, for example, a DVD, often referred to as a digital versatile disc or a digital video disc), a RAM, or a ROM. The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example, or to carry as data the actual syntax-values written by a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

Numerous specific details have been set forth herein to provide a thorough understanding of the present invention. It will be understood by those skilled in the art, however, that the examples above may be practiced without these specific details. In other instances, well-known operations, components and circuits have not been described in detail so as not to obscure the present invention. It can be appreciated that the specific structural and functional details disclosed herein may be representative and do not necessarily limit the scope of the present invention.

Various embodiments of the present invention may be implemented using hardware elements, software elements, or a combination of both. Some embodiments may be implemented, for example, using a computer-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus and constituents included therein, for example, a processor, an encoder and a decoder, may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants (PDAs), and other devices that facilitate communication of information between end-users.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing," intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Furthermore, aspects of the present disclosure can take the form of a computer-readable storage medium. Any combination of one or more computer-readable storage medium(s) may be utilized. A computer-readable storage medium can take the form of a computer-readable program product embodied in one or more computer-readable medium(s) and having computer-readable program code embodied thereon that is executable by a computer. A computer-readable storage medium as used herein is considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing.

It is to be appreciated that the following list, while providing more specific examples of computer-readable storage mediums to which the present disclosure may be applied, is merely an illustrative and not exhaustive listing as is readily appreciated by one of ordinary skill in the art. The list of examples includes a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

According to one aspect of the present disclosure, a computer-readable storage medium carrying a software program is provided including program code instructions for performing any of the embodiments of the method 1000 of providing power saving information for media content. The computer-readable storage medium may be non-transitory or transitory.

According to one aspect of the present disclosure, a non-transitory computer-readable program product is provided including program code instructions for performing any of the embodiments of the method 1000 of providing power saving information for media content.

According to one aspect of the present disclosure, a computer-readable storage medium carrying a software program is provided including program code instructions for performing any of the embodiments of the method 1100 of receiving power saving information for media content. The computer-readable storage medium may be non-transitory or transitory.

According to one aspect of the present disclosure, a non-transitory computer-readable program product is provided including program code instructions for performing any of the embodiments of the method 1100 of receiving power saving information for media content.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

The invention claimed is:

1. A method of providing power saving information for media content, the method comprising:
receiving media content comprising a plurality of media segments;
determining a power consumption indicator for a media segment of the plurality of media segments;
determining power saving information for the media segment based on the power consumption indicator for the media segment, including determining an indicator of playback speed for the media segment based on the power consumption indicator for the media segment, wherein playback of the media segment in accordance with the playback speed reduces power consumption by reducing a duration of playout time for the media segment from an original playout time of the media segment, wherein the playback speed decreases an average power consumption for the media content;
determining a first indicator of playout time for another media segment, wherein the first indicator of playout time indicates a longer playout time than an original playout time for the another media segment and a second indicator of playout time indicates a shorter playout time than an original playout time for the media segment;
wherein the second indicator of playout time and the first indicator of playout time when applied to the media segment and the another media segment, respectively, result in substantially the same playout time for the media content as an original playout time for the media content; and
providing the power saving information.

2. The method according to claim 1, wherein the providing further comprises providing the power saving information as metadata to the media content.

3. The method according to claim 1, wherein the power consumption indicator is a function of a luminance of the media segment.

4. The method according to claim 3, wherein the power consumption indicator is determined based on at least one of an average luminance of the media segment, a normalized luminance of the media segment, a linear function of the luminance of the media segment, and a non-linear function of the luminance of the media segment.

5. The method according to claim 1, wherein the average power consumption is a function of the power consumption indicator and an original playout time for the media segment.

6. The method according to claim 1, wherein the first indicator of playout time is a playout speed at which to play the another media segment.

7. The method according to claim 1, wherein the power consumption indicator estimates power usage while the media segment is displayed.

8. The method of claim 1, wherein the playback speed comprises an indication of a reduced number of frames for the media segment.

9. The method according to claim 1, wherein determining a power consumption indicator comprises estimating power consumption from luminance values of the media segment.

10. The method according to claim 1, wherein determining a power consumption indicator comprises estimating power consumption based on average power of a scene of the media content.

11. An apparatus for providing power saving information for media content, the apparatus comprising:
at least one memory;
a processor in communication with at least one input/output interface and the at least one memory, wherein the processor is configured to:
receive media content comprising a plurality of media segments;
determine a power consumption indicator for a media segment of the plurality of media segments;
determine power saving information for the media segment based on the power consumption indicator for the media segment, including determining an indicator of playback speed for the media segment based on the power consumption indicator for the media segment, wherein playback of the media segment in accordance with the playback speed reduces power consumption by reducing a duration of playout time for the media segment from an original playout time of the media segment, wherein the playback speed decreases an average power consumption for the media content;
determine a first indicator of playout time for another media segment, wherein the first indicator of playout time indicates a longer playout time than an original playout time for the another media segment and a second indicator of playout time indicates a shorter playout time than an original playout time for the media segment;
wherein the second indicator of playout time and the first indicator of playout time when applied to the media segment and the another media segment, respectively, result in substantially the same playout time for the media content as an original playout time for the media content; and
provide the power saving information.

12. The apparatus according to claim 11, wherein the processor is further configured to provide the power saving information as metadata to the media content.

13. The apparatus according to claim 11, wherein the power consumption indicator is a function of a luminance of the media segment.

14. The apparatus according to claim 11, wherein the playback speed decreases an average power consumption for the media content.

15. The apparatus according to claim 14, wherein the average power consumption is a function of the power consumption indicator and an original playout time for the media segment.

16. The apparatus of claim 11, wherein the playback speed comprises an indication of a reduced number of frames for the media segment.

17. A method comprising:
identifying a plurality of media segments of a media file;
identifying power consumption information for a first media segment of the plurality of media segments;
when the power consumption information for the first media segment exceeds a reference threshold, providing a playback speed modification for the first media segment, wherein playback of the first media segment in accordance with the playback speed reduces power consumption by reducing a duration of playout time for the first media segment from an original playout time of the first media segment, wherein the playback speed decreases an average power consumption for the plurality of media segments;
determining a first indicator of playout time for a second media segment, wherein the first indicator of playout time indicates a longer playout time than an original playout time for the second media segment and a second indicator of playout time indicates a shorter playout time than an original playout time for the first media segment;
wherein the second indicator of playout time and the first indicator of playout time when applied to the first media segment and the second media segment, respectively, result in substantially the same playout time for the plurality of media segments as an original playout time for the plurality of media segments; and
providing the playback speed modification associated with an identification of a start of the first media segment and an identification of an end of the first media segment.

18. The method of claim 17, wherein the playback speed modification comprises an indication of a reduced number of frames for the first media segment.

19. The method of claim 17, wherein the power consumption information estimates power usage while the first media segment is displayed.

20. The method of claim 17, wherein the playback speed modification comprises an indication of playout time for the first media segment.

21. The method of claim 17, wherein the reference threshold is variable.

22. The method according to claim 17, wherein the power consumption information is based on luminance of the media segment.

23. The method of claim 17, further comprising modifying a rate of extracting data from a buffer in which the media segments are stored to maintain a target buffer level to prevent buffer overflow or underflow.

24. An apparatus comprising at least one processor and at least one memory having stored instructions operative, when executed by the at least one processor, to cause the apparatus to:
identify a plurality of media segments of a media file;
identify power consumption information for a first media segment of the plurality of media segments;
when the power consumption information for the first media segment exceeds a reference threshold, provide a playback speed modification for the first media segment, wherein playback of the first media segment in accordance with the playback speed reduces power consumption by reducing a duration of playout time for the first media segment from an original playout time of the first media segment, wherein the playback speed decreases an average power consumption for the plurality of media segments;

determine a first indicator of playout time for a second media segment, wherein the first indicator of playout time indicates a longer playout time than an original playout time for the second media segment and a second indicator of playout time indicates a shorter playout time than an original playout time for the first media segment;

wherein the second indicator of playout time and the first indicator of playout time when applied to the first media segment and the second media segment, respectively, result in substantially the same playout time for the plurality of media segments as an original playout time for the plurality of media segments; and provide the playback speed modification associated with an identification of a start of the first media segment and an identification of an end of the first media segment.

25. A method comprising:

identifying a plurality of media segments of a media file;

identifying first power consumption information for a first media segment of the plurality of media segments, wherein the first power consumption information is based on luminance of the first media segment;

identifying second power consumption information for a second media segment of the plurality of media segments, wherein the second power consumption information is based on luminance of the second media segment, and wherein the first power consumption information is different from the second power consumption information;

providing the first power consumption information as first metadata for the first media segment with an identification of a start of the first media segment and an identification of an end of the first media segment in the media file;

providing the second power consumption information as second metadata for the second media segment with an identification of a start of the second media segment and an identification of an end of the second media segment in the media file;

identifying and providing power consumption metadata for a scene of the media file by dividing energy of the scene by a duration of the scene, wherein the scene comprises the first media segment and the second media segment, wherein playback of the first media segment in accordance with the first metadata reduces power consumption by reducing a duration of playout time for the first media segment from an original playout time of the first media segment, wherein playback in accordance with the the first metadata decreases an average power consumption for the plurality of media segments;

determining a first indicator of playout time for the second media segment, wherein the first indicator of playout time indicates a longer playout time than an original playout time for the second media segment and a second indicator of playout time indicates a shorter playout time than an original playout time for the first media segment; and wherein the second indicator of playout time and the first indicator of playout time when applied to the first media segment and the second media segment, respectively, result in substantially the same playout time for the plurality of media segments as an original playout time for the plurality of media segments.

26. The method of claim 25, wherein the first power consumption information is determined based on estimated power usage by an end user device for the first media segment.

* * * * *